(12) United States Patent
Kozakiewicz et al.

(10) Patent No.: US 10,975,278 B2
(45) Date of Patent: Apr. 13, 2021

(54) GRANULAR STABILIZER COMPOSITIONS FOR USE IN POLYMER RESINS AND METHODS OF MAKING SAME

(71) Applicant: Cytec Industries Inc., Princeton, NJ (US)

(72) Inventors: Joseph Kozakiewicz, Trumbull, CT (US); J. Mon-Hei Eng, Wilton, CT (US); Jian-Yang Cho, Easton, CT (US); Ram B. Gupta, Stamford, CT (US); Robert Hopper, Evans, WV (US)

(73) Assignee: Cytec Industries Inc., Princeton, NJ (US)

( * ) Notice: Subject to any disclaimer, the term of this patent is extended or adjusted under 35 U.S.C. 154(b) by 0 days.

(21) Appl. No.: 16/286,875

(22) Filed: Feb. 27, 2019

(65) Prior Publication Data

US 2019/0264084 A1 Aug. 29, 2019

Related U.S. Application Data

(60) Provisional application No. 62/636,833, filed on Feb. 28, 2018.

(30) Foreign Application Priority Data

Jun. 8, 2018 (EP) .................................... 18176717

(51) Int. Cl.
| | | |
|---|---|---|
| C09K 3/22 | (2006.01) | |
| C08K 5/3475 | (2006.01) | |
| C08K 5/3492 | (2006.01) | |
| C08K 5/132 | (2006.01) | |
| C08K 5/357 | (2006.01) | |
| C08K 5/3435 | (2006.01) | |
| C08K 5/3462 | (2006.01) | |
| C08K 5/134 | (2006.01) | |
| C08K 5/13 | (2006.01) | |
| C08K 5/523 | (2006.01) | |
| C08K 5/527 | (2006.01) | |
| C08K 5/5393 | (2006.01) | |
| C08K 5/38 | (2006.01) | |
| C08K 5/17 | (2006.01) | |
| C08K 5/20 | (2006.01) | |
| C08K 5/06 | (2006.01) | |
| C08K 5/103 | (2006.01) | |
| C08K 5/101 | (2006.01) | |
| C08K 5/05 | (2006.01) | |

(52) U.S. Cl.
CPC ............ *C09K 3/22* (2013.01); *C08K 5/05* (2013.01); *C08K 5/06* (2013.01); *C08K 5/101* (2013.01); *C08K 5/103* (2013.01); *C08K 5/13* (2013.01); *C08K 5/132* (2013.01); *C08K 5/1345* (2013.01); *C08K 5/17* (2013.01); *C08K 5/20* (2013.01); *C08K 5/3435* (2013.01); *C08K 5/3462* (2013.01); *C08K 5/3475* (2013.01); *C08K 5/3492* (2013.01); *C08K 5/357* (2013.01); *C08K 5/38* (2013.01); *C08K 5/523* (2013.01); *C08K 5/527* (2013.01); *C08K 5/5393* (2013.01); *C08K 2201/014* (2013.01)

(58) Field of Classification Search
CPC .. C09K 3/22; C08K 2201/014; C08K 5/3475; C08K 5/3492; C08K 5/132; C08K 5/357; C08K 5/3435; C08K 5/3462; C08K 5/1345; C08K 5/13; C08K 5/523; C08K 5/527; C08K 5/5393; C08K 5/38; C08K 5/20; C08K 5/06
USPC .......................................................... 524/89
See application file for complete search history.

(56) References Cited

U.S. PATENT DOCUMENTS

| | | |
|---|---|---|
| 2,976,259 A | 3/1961 | Hardy |
| 3,049,443 A | 8/1962 | Coleman |
| 3,399,169 A | 8/1968 | Horton |
| 4,322,455 A | 3/1982 | Olson et al. |
| 4,446,086 A | 5/1984 | Molenaar et al. |
| 4,670,181 A | 6/1987 | Mollinger et al. |
| 4,902,210 A | 2/1990 | Shibata |
| 5,292,461 A | 3/1994 | Juch et al. |
| 5,773,503 A | 6/1998 | Steen et al. |
| 5,846,656 A | 12/1998 | Dunski |
| 6,033,600 A | 3/2000 | Henkins et al. |
| 6,051,164 A | 4/2000 | Samuels |
| 6,515,052 B2 | 2/2003 | Semen |
| 6,596,198 B1 | 7/2003 | Semen |
| 6,677,392 B2 | 1/2004 | Ravichandran et al. |
| 6,800,228 B1 | 10/2004 | Semen |

(Continued)

FOREIGN PATENT DOCUMENTS

| | | | |
|---|---|---|---|
| EP | 0259960 A2 | | 7/1987 |
| EP | 2246388 | * | 11/2010 |
| EP | 2246388 A1 | | 11/2010 |

OTHER PUBLICATIONS

Int'l Preliminary Report on Patentability for corresponding Int'l Application No. PCT/US2019/019716, dated Sep. 1, 2020.

*Primary Examiner* — Hui H Chin
(74) *Attorney, Agent, or Firm* — Charles E. Bell, Esq.

(57) ABSTRACT

Granular stabilizer compositions including concentrated blends of one or more polymer additive, and one or more co-active agent, which compositions are low-dusting and substantially free of a carrier polymer resin are disclosed herein, along with process for making the stabilizer compositions, and uses of such stabilizer compositions for providing enhanced protection of polymer resins against deleterious effects from air (oxygen), residual catalyst, mechanical stress, heat, and light.

37 Claims, 1 Drawing Sheet

(56) References Cited

U.S. PATENT DOCUMENTS

| | | |
|---|---|---|
| 6,843,939 B2 | 1/2005 | Stretanski et al. |
| 7,105,590 B2 | 9/2006 | Krohnke et al. |
| 7,166,660 B2 | 1/2007 | Staniek |
| 2004/0152807 A1 | 8/2004 | Stadler |
| 2006/0052491 A1 | 3/2006 | Braig et al. |
| 2009/0085252 A1 | 4/2009 | Minder et al. |
| 2012/0146257 A1 | 6/2012 | Eng et al. |
| 2013/0145962 A1* | 6/2013 | Gupta ............... C08K 5/34 106/287.21 |
| 2016/0145427 A1* | 5/2016 | Eng ............... C08L 23/12 524/100 |

* cited by examiner

GRANULAR STABILIZER COMPOSITIONS FOR USE IN POLYMER RESINS AND METHODS OF MAKING SAME

CROSS REFERENCE TO RELATED APPLICATIONS

This application claims benefit of priority from European Patent Application No. EP 18176717, filed Jun. 8, 2018 (withdrawn), and from U.S. Provisional Patent Application No. 62/636,833, filed Feb. 28, 2018, each of which is incorporated herein by reference in its entirety.

BACKGROUND OF THE INVENTION

Field of the Invention

The present invention generally relates to the field of polymer additives. More specifically, the invention relates to highly concentrated forms of stabilizer compositions that provide improved characteristics in shipping, handling, storage, and/or processing, and which provide enhanced protection to organic polymers against deleterious effects from air (oxygen), residual catalyst, mechanical stress, heat, and light.

Description of the Related Art

A large body of art has been developed directed toward polymeric additive stabilizer compositions capable of inhibiting degradation in organic materials such as plastics and polymeric articles due to deleterious effects from air (oxygen), residual catalyst, mechanical stress, heat, and light wherein these additives are admixed with the organic polymeric materials. The stabilizer additives include several different classes of compounds, such as UV absorbers (UVA), hindered amine light stabilizers (HALS), hindered phenol antioxidants, hindered benzoate (HB), 3-arylbenzofuranones, thioesters, thermal or heat stabilizers, antiozonants, phosphites and phosphonites. In many cases, to obtain optimum protection, a mixture of compounds, each specifically selected to afford maximum protection against a certain type of degradation, is often used.

Although certain of such stabilizer additives may be added during the polymerization process, this approach may prove unsatisfactory for the incorporation of other additives. For example, the efficiency of the polymerization process may be adversely affected by interaction of the stabilizer(s) with the polymerization catalyst, the polymer stabilizer in question may exhibit incompatibility with other additives used in the polymerization process, and/or the subsequent treatment of the polymer may be restricted by the presence of the incorporated stabilizer at such an early stage.

One method of introducing the stabilizers which may be used individually, or in an additive "system" that includes a pre-formed blend of stabilizers, is to admix the stabilizers with the polymer resin to be stabilized during post-reactor extrusion operations. However, many stabilizers, often used in the manufacture of polymers are powder and can create hazardous airborne dusts during handling and blending operations. Powder additives are difficult to convey in the systems most commonly used in the plastics industry, and significant losses of the powders occur during conveying. Powder additives also are dusty, presenting a potential for dust explosion and potential health risks to workers, who either inhale the dust or whose skin comes into contact with the dust. Additionally, powders are difficult to meter accurately. Thus, charging 100% individual additive components has several issues, e.g., dusty, multiple hopper/feeders for multiple additives, sticky due to equipment high temperature melting the additives, adding several component individually leads to inhomogeneity, additive agglomeration/poor dispersion in the polymer, storage agglomeration and shipping agglomeration.

In order to facilitate blending operations it is therefore desirable to provide stabilizer compositions in a granular form because many stabilizer additives can cake up or form "rat-holes" in feed hoppers, and/or feed unevenly through metering equipment. On the other hand, charging preformed blends of additives improves dispersion and less feeding system is required. However, some issues (e.g., dusty when tumbled, and agglomeration during storage and/or shipping) remain unresolved.

Another method of introducing stabilizer compositions to polymer resins is to first prepare a stabilizer concentrate; that is, a pre-blend of the stabilizer and a polymer resin which contains a high level of the stabilizer and which can, therefore, serve as a masterbatch or concentrate. The use of a masterbatch or concentrate is a generally preferred technique, particularly with liquid or pasty additives, as the neat use of additives having such physical form frequently gives rise to dosing problems and often requires special metering pumps or other expensive equipment. In general, however, it has been found difficult to obtain polymer additive concentrates having a liquid or pasty additive concentration in excess of about 15 percent by weight in the masterbatch.

In order to overcome the low additive concentration problem in a masterbatch composition, European Patent Application Publication No. 259,960 A2 discloses a means of greatly increasing the percentage of polymer additive in such concentrates by employing a particulate solid, preferably silica, as an absorbent for liquid, pasty or waxy, low-melting point solid additives. This loaded absorbent is blended with a suitable polymer under conditions such that a super concentrate containing from 15-80 percent by weight of such an additive is formed. However while the polymer additive concentrates of EP 259,960 will provide masterbatch compositions having greatly increased loads of liquid, paste or waxy additives, certain drawbacks exist with respect to such concentrates. Specifically, when such concentrates are let down into polymers which are extruded into clear films, the silica (or other particulate filler) adversely affects the clarity of the final film.

In another approach, several patents U.S. Pat. Nos. 6,596,198; 6,033,600; 5,773,503; and 5,846,656 describe using inert binder, processing aid or filler, where the stabilizer additive system comprises at least a stabilizer and a binder or processing aid for compacted pellet blends.

In yet another approach, U.S. Pat. Nos. 6,515,052 and 6,800,228 describe using a solvent in a compaction process to improve the yield and quality (lower friability) of a compacted polymer additive blend.

EP 2 246 388 also discloses a granular stabilizer formulation for imparting stability against light and heat in the use of thermoplastic polymer material, which formulation is a dust prevention countermeasure. The formulation includes a hindered phenol antioxidant and a hindered amine of the formula (1). Optionally, the formulation can further include an additive selected from the group consisting of a phosphorus-based antioxidant, an ultraviolet light absorber, a neutralizing agent, a lubricant, an anti-blocking agent, an antistatic agent, a pigment, a nucleating agent, and a flame retardant.

Thus, several approaches to make low-dusting granular or pelletized polymer additive stabilizer compositions, which are based on the use of a solvent, or using inert organic/inorganic filler or binders or processing aid or polymer resin carrier are known in the patent literature. However, these inert/inactive fillers don't contribute towards stabilization of the polymer resin and are otherwise useless. Furthermore, the use of carrier polymer resin lowers the overall active amount of the stabilizer. Such a polymer resin may not be desirable or may be incompatible with some applications and, thus, unable to be used universally for all applications.

Accordingly, there continues to be a need for an improved product form for delivering particular stabilizer additives to polymer resins. A stabilizer additive composition having a high concentration of active ingredients and provided as a low-dust granular form, which is substantially free of carrier polymer resin, and which avoids using solvent in its manufacturing process, will be a useful advance in the field of polymer stabilization technology and could find rapid acceptance in the industry.

SUMMARY OF THE INVENTION

The foregoing and additional objects are attained in accordance with the principles of the invention wherein the inventors have now surprisingly discovered that certain co-active agents when used with one or more polymer additives in a process substantially free of solvents form low-dust granular stabilizer compositions having a high concentration of active ingredients (up to 100%), and are useful in polymer resin systems for providing enhanced stability and protection against deleterious effects from air (oxygen), residual catalyst, mechanical stress, heat, and light. An advantageous feature of the instant invention is its ability for increased throughput.

Granular stabilizer systems having "increased throughput" refer to those granular stabilizer systems according to the compositions of the invention described herewith that have at least 50% more throughput (measured in Kg/hour) compared to granular stabilizer formulations not containing any co-active agents, or with other binders disclosed in the literature, as measured by the methods described herewith.

Thus in one aspect, the instant invention provides a granular stabilizer composition having:

i) at least one polymer additive selected from the group consisting of UV absorbers (UVA), hindered amine light stabilizers (HALS), hindered phenol antioxidants, hindered benzoate (HB), 3-arylbenzofuranones, thioesters, N,N-disubstituted hydroxylamines, organophosphines, phosphites, and phosphonites; and ii) at least one co-active agent selected from the group consisting of alkoxylated aliphatic alcohols; alkoxylated esters of fatty acids; alkoxylated fatty amines or salts thereof; and alkoxylated fatty amides, wherein the co-active agent has a melting point from 45° C. to 100° C., wherein the granular stabilizer composition is further characterized as being low-dusting and substantially free of a carrier polymer resin.

As used herein, a "low-dusting granular stabilizer composition" refers to a granular stabilizer system according to the compositions of the invention described herewith that has at least 50% less dust compared to granular stabilizer formulations not containing any co-active agents, or just less dust compared to granular stabilizer formulations with other binders disclosed in the literature, as measured by the methods described herewith.

In another aspect, the invention provides a polymer resin composition having a polymer resin and a granular stabilizer composition of the formulation as substantially described in detail and/or claimed herewith. Attendant to this aspect of the invention is the use of a granular stabilizer composition as substantially described in detail and/or claimed herewith for stabilizing a polymer resin.

In yet another aspect, the invention provides a process for making a granular stabilizer composition as substantially described in detail and/or claimed herewith, by (a) mixing at least one polymer additive and at least one co-active agent as described herein to produce a homogenous initial powder blend, wherein the initial powder blend is substantially solvent-free;

(b) compacting the initial powder blend according to any means known to those skilled in the art; and (c) granulating the compacted material according to any means known to those skilled in the art.

In another aspect of the process for making a granular stabilizer composition according to the invention, the substantially solvent-free initial powder blend is extruded according to any means known to those skilled in the art, and then granulated.

These and other objects, features and advantages of this invention will become apparent from the following detailed description of the various aspects of the invention taken in conjunction with the accompanying figures and Examples.

DETAILED DESCRIPTION OF PREFERRED EMBODIMENTS

Figure 1:
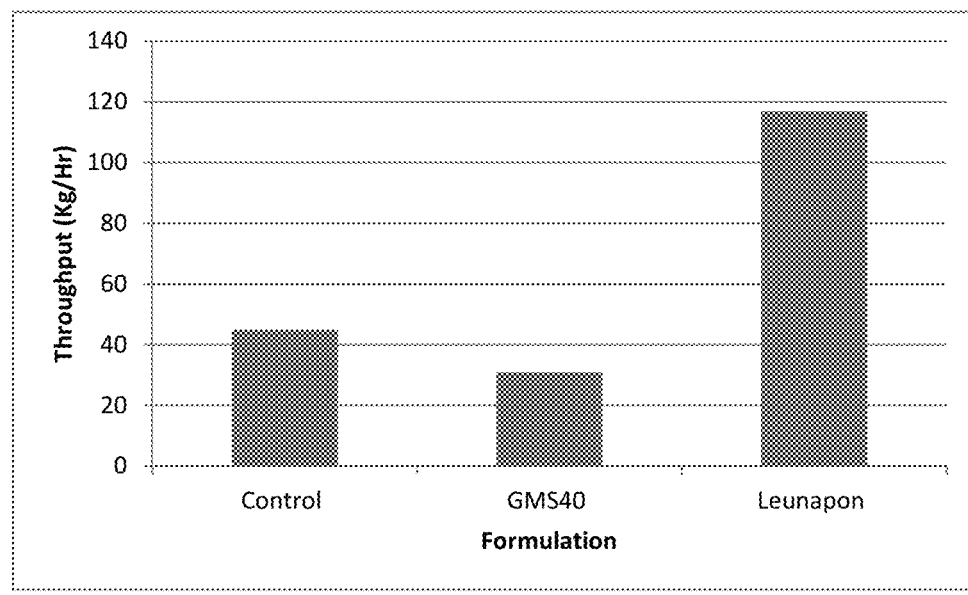
FIG. 1 is a graph demonstrating the compaction throughput (in kilograms per hour) of the formulations (a), (b), and (c) described in Example 1.

As stated above, the inventors have now surprisingly found that a combination of specific co-active agents when mixed with one or more of polymer additives in powder form and subjected to compaction or extrusion yield a low-dust granular form of polymer additive stabilizer system having up to 100% active ingredients. It has also been discovered that these co-active agents significantly improve the throughput for the production of granular form during the compaction process and have lower-fines than granular stabilizer formulations not containing these co-active agents or with other binders disclosed in the literature.

Co-Active Agents.

The "co-active agents" have been described in patent application US 2016/0145427 A1, which is expressly incorporated herein by reference. Accordingly, as used throughout the specification and claims, the term "co-active agent" shall refer to any additive compound, or mixtures of additive compounds, that acts synergistically with various stabilizer additives (e.g., UV absorbers and/or HALS) to help stabilize organic materials from the deleterious effects of UV light, heat and/or oxidation. Suitable co-active agents can preferably have a melting temperature that is less than the melting temperature of the stabilizer in the additive system. Suitable co-active agents generally have melting temperatures of from about 45° C. to about 100° C., preferably from about 50° C. to about 85° C. Suitable co-active agents for the instant invention are selected from the group consisting of alkoxylated aliphatic alcohols; alkoxylated esters of fatty acids; alkoxylated fatty amines or salts thereof; alkoxylated fatty amides; and mixtures thereof.

The suitable polymer stabilizer additives which are mixed with suitable co-active agents for the formation of granular low-dust polymer stabilizer system of the instant invention are selected from: UV absorbers (UVA), hindered amine light stabilizers (HALS), hindered phenol antioxidants, hindered benzoate (HB), 3-arylbenzofuranones, thioesters, N,N-disubstituted hydroxylamines, organophosphines, phosphites, phosphonites, and mixtures thereof.

The term "100% active ingredients" in the context of the instant invention means that all the components of the granular polymer stabilizer system are required for the polymer stabilization performance and there is no inert or inactive filler or binder and there is no polymer resin carrier.

The phrase "substantially free of a carrier polymer resin" as used herein means that the granular stabilizer composition contains less than 10 wt. % of carrier polymer resin based on the total weight of the stabilizer composition; preferably less than 5 wt. %; more preferably less than 0.5 wt. %; and most preferably contains no carrier polymer resin.

The terms "comprised of," "comprising," or "comprises" as used herein includes embodiments "consisting essentially of" or "consisting of" the listed elements.

Those skilled in the art will appreciate that while preferred embodiments are discussed in more detail below, multiple embodiments of the granular stabilizer composition, uses thereof, polymer compositions incorporating such stabilizer compositions, and processes for manufacturing said stabilizer compositions described herein are contemplated as being within the scope of the present invention. Thus, it should be noted that any feature described with respect to one aspect or one embodiment of the invention is interchangeable with another aspect or embodiment of the invention unless otherwise stated.

Furthermore, for purposes of describing the present invention, where an element, component, or feature is said to be included in and/or selected from a list of recited elements, components, or features, those skilled in the art will appreciate that in the related embodiments of the invention described herein, the element, component, or feature can also be any one of the individual recited elements, components, or features, or can also be selected from a group consisting of any two or more of the explicitly listed elements, components, or features. Additionally, any element, component, or feature recited in such a list may also be omitted from such list.

Those skilled in the art will further understand that any recitation herein of a numerical range by endpoints includes all numbers subsumed within the recited range (including fractions), whether explicitly recited or not, as well as the endpoints of the range and equivalents. The term "et seq." is sometimes used to denote the numbers subsumed within the recited range without explicitly reciting all the numbers. Disclosure of a narrower range or more specific group in addition to a broader range or larger group is not a disclaimer of the broader range or larger group.

Throughout this specification the terms and substituents retain their definitions. A comprehensive list of abbreviations utilized by organic chemists (i.e. persons of ordinary skill in the art) appears in the first issue of each volume of the Journal of Organic Chemistry. The list, which is typically presented in a table entitled "Standard List of Abbreviations," is incorporated herein by reference.

The term "hydrocarbyl" is a generic term encompassing aliphatic, alicyclic and aromatic groups having an all-carbon backbone and consisting of carbon and hydrogen atoms. In certain cases, as defined herein, one or more of the carbon atoms making up the carbon backbone may be replaced or interrupted by a specified atom or group of atoms, such as by one or more heteroatom of N, O, and/or S. Examples of hydrocarbyl groups include alkyl, cycloalkyl, cycloalkenyl, carbocyclic aryl, alkenyl, alkynyl, alkylcycloalkyl, cycloalkylalkyl, cycloalkenylalkyl, and carbocyclic aralkyl, alkaryl, aralkenyl and aralkynyl groups. Such hydrocarbyl groups can also be optionally substituted by one or more substituents as defined herein. Accordingly, the chemical groups or moieties discussed in the specification and claims should be understood to include the substituted or unsubstituted forms. The examples and preferences expressed below also apply to each of the hydrocarbyl substituent groups or hydrocarbyl-containing substituent groups referred to in the various definitions of substituents for compounds of the formulas described herein unless the context indicates otherwise.

Preferred non-aromatic hydrocarbyl groups are saturated groups such as alkyl and cycloalkyl groups. Generally, and by way of example, the hydrocarbyl groups can have up to fifty carbon atoms, unless the context requires otherwise. Hydrocarbyl groups with from 1 to 30 carbon atoms are preferred. Within the sub-set of hydrocarbyl groups having 1 to 30 carbon atoms, particular examples are C1-20 hydrocarbyl groups, such as C1-12 hydrocarbyl groups (e.g. C1-6 hydrocarbyl groups or C1-4 hydrocarbyl groups), specific examples being any individual value or combination of values selected from C1 through C30 hydrocarbyl groups.

Alkyl is intended to include linear, branched, or cyclic hydrocarbon structures and combinations thereof. Lower alkyl refers to alkyl groups of from 1 to 6 carbon atoms; preferably from 1 to 4 carbon atoms. Examples of lower alkyl groups include methyl, ethyl, propyl, isopropyl, butyl, s- and t-butyl, pentyl, hexyl, isomers and the like. Preferred alkyl groups are those of C30 or below.

Alkoxy or alkoxyalkyl refers to groups of from 1 to 20 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like.

Acyl refers to formyl and to groups of 1, 2, 3, 4, 5, 6, 7, 8, 9, 10, 11 and 12 carbon atoms of a straight, branched, cyclic configuration, saturated, unsaturated and aromatic and combinations thereof, attached to the parent structure through a carbonyl functionality. Examples include acetyl, benzoyl, propionyl, isobutyryl, t-butoxycarbonyl, benzyloxycarbonyl and the like. Lower-acyl refers to groups containing one to six carbons.

References to "carbocyclic" or "cycloalkyl" groups as used herein shall, unless the context indicates otherwise, include both aromatic and non-aromatic ring systems. Thus, for example, the term includes within its scope aromatic, non-aromatic, unsaturated, partially saturated and fully saturated carbocyclic ring systems. In general, such groups may be monocyclic or bicyclic and may contain, for example, 3 to 12 ring members, more usually 5 to 10 ring members. Examples of monocyclic groups are groups containing 3, 4, 5, 6, 7, and 8 ring members, more usually 3 to 7, and preferably 5 or 6 ring members. Examples of bicyclic groups are those containing 8, 9, 10, 11 and 12 ring members, and more usually 9 or 10 ring members. Examples of non-aromatic carbocycle/cycloalkyl groups include c-propyl, c-butyl, c-pentyl, c-hexyl, and the like. Examples of C7 to C10 polycyclic hydrocarbons include ring systems such as norbornyl and adamantyl.

The term "aryl" as used herein refers to cyclic aromatic hydrocarbons that do not contain heteroatoms in the ring. In any or all embodiments, aryl groups contain about 6 to about 14 carbons in the ring portions of the groups. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those known to persons of skill in the art.

Substituted hydrocarbyl, alkyl, aryl, cycloalkyl, alkoxy, etc. refer to the specific substituent wherein up to three H atoms in each residue are replaced with alkyl, halogen, haloalkyl, hydroxy, alkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, halobenzyl, heteroaryl, phenoxy, benzyloxy, heteroaryloxy, benzoyl, halobenzoyl, or lower alkylhydroxy.

Ortho-hydroxyphenyl triazines are well known in the art and in the field of stabilizer additive technology. They have been disclosed and treated in many references and patents including U.S. Pat. Nos. 6,051,164; and 6,843,939, the teachings of which are incorporated herein by reference. Particularly preferred ortho-hydroxyphenyl triazines include 2-(2'-hydroxyphenyl)-1,3,5-triazine compounds according to Formula (I):

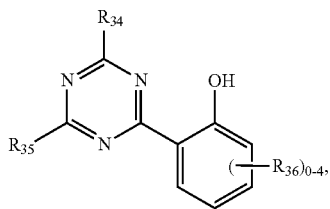
(I)

wherein the substituents are defined as follows:
$R_{34}$ and $R_{35}$ are the same or different and are independently chosen from
    a $C_6$-$C_{10}$ aryl group optionally substituted at from 1 to 3 substitutable positions with one or more group chosen from OH, halogen, $C_1$-$C_{12}$ alkyl, $C_1$-$C_{12}$ alkoxy, $C_{1-12}$ alkoxyester, $C_{2-12}$ alkanoyl, or phenyl, wherein the phenyl is optionally substituted at from 1 to 3 substitutable positions with one or more group chosen from: hydroxyl, halogen, $C_{1-12}$ alkyl, $C_{1-12}$ alkoxy, $C_{1-12}$ alkoxyester, or $C_{2-12}$ alkanoyl;
    mono- or di-$C_1$-$C_{12}$ hydrocarbyl-substituted amino;
    $C_2$-$C_{12}$ alkanoyl;
    $C_1$-$C_{12}$ alkyl;
    $C_1$-$C_{10}$ acyl; or
    $C_1$-$C_{10}$ alkoxyl; and
$R_{36}$ is a substituent that is present at from 0 to 4 instances of the phenoxy portion of Formula (I) and in each instance is independently chosen from hydroxyl, halogen, $C_1$-$C_{12}$ alkyl, $C_1$-$C_{12}$ alkoxy, $C_1$-$C_{12}$ alkoxyester, $C_2$-$C_{12}$ alkanoyl; phenyl; or $C_1$-$C_{12}$ acyl.

Commercially available ortho-hydroxyphenyl triazines include, but are not limited to, those under the tradenames CYASORB® UV-1164 (available from Solvay); TINUVIN® 1577FF, TINUVIN® 400 or TINUVIN® 1600 (available from BASF). In certain embodiments the ortho-hydroxyphenyl triazine compound of the stabilizer composition include, but are not limited to, one or more of the following:
4,6-bis-(2,4-dimethylphenyl)-2-(2-hydroxy-4-octyloxyphenyl)-s-triazine;
2-(4,6-Diphenyl-1,3,5-triazin-2-yl-)-5-((hexyl)oxyl-phenol;
4,6-bis-(2,4-dimethylphenyl)-2-(2,4-dihydroxyphenyl)-s-triazine;
2,4-bis(2,4-dihydroxyphenyl)-6-(4-chlorophenyl)-s-triazine;
2,4-bis[2-hydroxy-4-(2-hydroxy-ethoxy)phenyl]-6-(4-chlorophenyl)-s-triazine;
2,4-bis[2-hydroxy-4-(2-hydroxy-4-(2-hydroxy-ethoxy)phenyl]-6-(2,4-dimethylphenyl)-s-triazine;
2,4-bis[2-hydroxy-4-(2-hydroxyethoxy)phenyl]-6-(4-bromophenyl)-s-triazine;
2,4-bis[2-hydroxy-4-(2-acetoxyethoxy)phenyl]-6-(4-chlorophenyl)-s-triazine;
2,4-bis(2,4-dihydroxyphenyl)-6-(2,4-dimethylphenyl)-s-triazine;
2,4-bis(4-biphenylyl)-6-[2-hydroxy-4-[(octyloxycarbonyl)ethylideneoxy]phenyl]-s-triazine;
2,4-bis(4-biphenylyl)-6-[2-hydroxy-4-(2-ethylhexyloxy)phenyl]-s-triazine;
2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;
2,4-bis(2,4-dimethylphenyl)-6-[2-hydroxy-4(-3-benzyloxy-2-hydroxypropyloxy)phenyl]-s-triazine;
2,4-bis(2-hydroxy-4-n-butyloxyphenyl)-6-(2,4-di-n-butyloxyphenyl)-s-triazine;
2,4-bis(2,4-dimethylphenyl)-6-[2-hydroxy-4-(3-nonyloxy-2-hydroxypropyloxy)-5-α-cumylphenyl]-s-triazine;
methylenebis-{2,4-bis(2,4-dimethylphenyl)-6-[2-hydroxy-4-(3-butyloxy-2-hydroxypropoxy)phenyl]-s-triazine;
methylene bridged dimer mixture bridged in the 3:5', 5:5' and 3:3' positions in a 5:4:1 ratio;
2,4,6-tris(2-hydroxy-4-isooctyloxycarbonyliso-propylideneoxy-phenyl)-s-triazine;
2,4,6-tris(2-hydroxy-4-octyloxy-phenyl)-1,3,5-triazine;
2,4-bis(2,4-dimethylphenyl)-6-(2-hydroxy-4-hexyloxxy-5-α-cumylphenyl)-s-triazine;
2-(2,4,6-trimethylphenyl)-4,6-bis[2-hydroxy-4-(3-butyloxy-2-hydroxypropyloxy)phenyl]-s-triazine;
2,4,6-tris[2-hydroxy-4-(3-sec-butyloxy-2-hydroxypropyloxy)-phenyl]-s-triazine;
mixture of 4,6-bis-(2,4-dimethylphenyl)-2-(2-hydroxy-4-(3-dodecyloxy-2-hydroxypropoxy)phenyl)-s-triazine and 4,6-bis-(2,4-dimethylphenyl)-2-(2-hydroxy-4-(3-tridecyloxy-2-hydroxypropoxy)phenyl)-s-triazine;
4,6-bis-(2,4-dimethylphenyl)-2-(2-hydroxy-4(3-(2-ethylhexyloxy)-2-hydroxypropoxy)-phenyl)-s-triazine; or
4,6-diphenyl-2-(4-hexyloxy-2-hydroxyphenyl)-s-triazine.

Other UVAs that are suitable for use with the monohydric and/or polyhydric alcohol organic compounds, or their alkoxylated derivatives, as described herein include ortho-hydroxybenzophenones or ortho-hydroxybenzotriazoles. In some embodiments, the UVA component of the stabilizer composition includes ortho-hydroxy-triazines, -benzophenones, or -benzotriazoles individually. In other embodiments, the UVA component includes combination of two or more of such compounds. Ortho-hydroxybenzophenones and -benzotriazles are also well known to those skilled in the art of stabilizer additive technology. Their suitability for use as a component of stabilizer compositions has been previously disclosed and treated in at least U.S. Pat. Nos. 2,976,259; 3,049,443; 3,399,169; 4,322,455; 6,051,164; and 6,677,392, as well as U.S Publication No. 2006/0052491, the benzophenones and benzotriazoles of which are incorporated herein by reference as suitable for use with the stabilizer compositions of the instant invention.

Some other non-limiting examples of ortho-hydroxybenzophenones for use with the stabilizer compositions contemplated herein include any one or more of 2-hydroxy-4-methoxybenzophenone (commercially available from Solvay as CYASORB® UV-9); 2,2'-dihydroxy-4-methoxybenzophenone (commercially available from Solvay as CYASORB® UV-24); 2-hydroxy-4-octyloxybenzophenone (commercially available from Solvay as CYASORB® UV-531); 2'-dihydroxy-4,4'-di-methoxybenzophenone; 2,2'-dihydroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4,4'-dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxybenzophenone; 2-hydroxy-4,4',6'-tributoxybenzophenone; 2-hydroxy-4-butoxy-4',5'-dimethoxybenzophenone; 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone; 2-hydroxy-4-ethoxybenzophenone; 2-hydroxy-4-propoxybenzophenone; 2-hydroxy-4-butoxybenzophenone; 2-hydroxy-4-methoxy-4'-methylbenzophenone; 2-hydroxy-4-methoxy-4'-ethylbenzophenone; 2-hydroxy-4-methoxy-4'-propylbenzophenone; 2-hydroxy-4-methoxy-4'-butylbenzophenone; 2-hydroxy-4-methoxy-4'-tertiary butylbenzophenone; 2-hydroxy-4-methoxy-4'-chlorobenzophenone; 2-hydroxy-4-methoxy-2'-chlorobenzophenone; 2-hydroxy-4-methoxy-4'-bromobenzophenone; 2-hydroxy-4,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4,4',5'-trimethoxybenzophenone; 2-hydroxy-4-ethoxy-4'-methylbenzophenone; 2-hydroxy-4-ethoxy-4'-ethylbenzophenone; 2-hydroxy-4-ethoxy-4'-propylbenzophenone; 2-hydroxy-4-ethoxy-4'-butylbenzophenone; 2-hydroxy-4-ethoxy-4'-methoxybenzophenone; 2-hydroxy-4,4'-diethoxybenzophenone; 2-hydroxy-4-ethoxy-4'-propoxybenzophenone; 2-hydroxy-4-ethoxy-4'-butoxybenzophenone; 2-hydroxy-4-ethoxy-4'-chlorobenzophenone; or 2-hydroxy-4-ethoxy-4'-bromobenzophenone.

Some other non-limiting examples of ortho-hydroxybenzotriazoles useful in the UVA component of the stabilizer compositions described herein include any one or more of those commercially available from Solvay (e.g., CYASORB® UV-5411), or 2-(2'-hydroxy-5'-methylphenyl)-benzotriazole; 2-(2'-hydroxy-5'-tert-butylphenyl)benzotriazole; 2-(2'-hydroxy-3'-methyl-5'-tert-butylphenyl)-benzotriazole; 2-(2'-hydroxy-5'-cyclohexylphenyl)-benzotriazole; 2-(2'-hydroxy-3',5'-dimethylphenyl)-benzotriazole; 2-(2'-hydroxy-5'-tert-butylphenyl)-5-chloro-benzotriazole; 2-(2'-hydroxy-5-tert-octylphenyl)-2H-benzotriazole; 2-(2'-hydroxy-5-octylphenyl)-2H-benzotriazole; 2-(3',5'-di-tert-butyl-2'-hydroxyphenyl)-5-chlorobenzotriazole; 2-(3',5'-di-tert-amyl-2'-hydroxyphenyl)benzotriazole (commercially available from Solvay as CYASORB® UV-2337); 2-(3',5'-bis($\alpha,\alpha$-dimethylbenzyl)-2'-hydroxyphenyl)benzotriazole; 2-(3'-tert-butyl-2'-hydroxy-5'-(2-octyloxycarbonylethyl)phenyl)benzotriazole; 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; 2-[2'-hydroxy-3'-($\alpha,\alpha$-dimethylbenzyl)-5'-(1,1,3,3-tetramethyl-butyl)phenyl]benzotriazole; 5-trifluoromethyl-2-(2-hydroxy-3-$\alpha$-cumyl-5-tert-octylphenyl)-2H-benzotriazole; 2-(2'-hydroxy-5'-(2-hydroxyethyl)phenyl)benzotriazole; 2-(2'-hydroxy-5'-(2-methacryloyloxyethyl)phenyl)benzotriazole; 2-(3'-tert-butyl-5'-methyl-2'-hydroxyphenyl)-5-chloro-benzotriazole; 2-(3'-sec-butyl-5'-tert.butyl-2'-hydroxyphenyl)-benzotriazole; 2-(3',5'-di-tert-butyl-2'-hydroxyphenyl)-benzotriazole; 2-(5'-tert-octyl-2'-hydroxyphenyl)-benzotriazole; 2-(3'-dodecyl-5'-methyl-2'-hydroxyphenyl)-benzotriazole; 2-(3'-tert-butyl-5'-(2-octyloxycarbonylethyl)-2'-hydroxyphenyl)-5-chlorobenzotriazole; 2-(5'-methyl-2'-hydroxyphenyl)-benzotriazole; 2-(5'-tert-butyl-2'-hydroxyphenyl)-benzotriazole; or 2-(2'-hydroxy-3'-di-tert-butylphenyl)-benzotriazole.

Other UVA classes can also be beneficially used as part of the stabilizer compositions described herein. As previously discussed HALS compounds scavenge free radicals formed in polymeric materials when exposed to UV light, and are more effective than certain UVAs used alone. The benefits imparted by various HALS compounds in combination with other UVAs have been demonstrated in at least U.S. Pat. Nos. 6,051,164 and 6,843,939, which teachings are incorporated herein by reference. Accordingly, in certain embodiments the UVA component of the stabilizer compositions described herein can further include a stabilizing amount of one or more HALS compound that includes a functional group according to Formula (II):

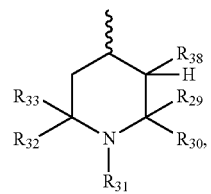

(II)

wherein the substituents of Formula (II) are defined as follows:

$R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy;

$R_{38}$ is chosen from: hydrogen; or $C_1$-$C_8$ hydrocarbyl; and each of $R_{29}$, $R_{30}$, $R_{32}$, and $R_{33}$ is independently chosen from $C_1$-$C_{20}$ hydrocarbyl, or $R_{29}$ and $R_{30}$ and/or $R_{32}$ and $R_{33}$ taken together with the carbon to which they are attached form a $C_5$-$C_{10}$ cycloalkyl;

or a functional group according to Formula (IIa):

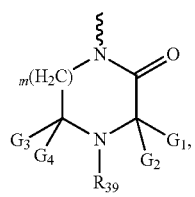

wherein the substituents of Formula (IIa) are defined as follows:

m is an integer from 1 to 2;

$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and each of $G_1$-$G_4$ is independently chosen from $C_1$-$C_{20}$ hydrocarbyl;

or mixtures of functional groups according to Formula (II) and Formula (IIa).

Exemplary HALS compounds contemplated for use as part of the polymer additive component of the stabilizer compositions described herein can include one or more of those commercially available from Solvay (e.g., CYASORB® UV-3853), or bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl)sebacate; bis (1-octyloxy-2,2,6,6-tetramethylpiperidin-4-yl)sebacate; bis (1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5] decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine (commercially available from Cytec Industries Inc. as CYASORB® UV-3346); a condensate of N,N'-bis(2,2,6,6-tetramethylpiperidin-4-yl)hexamethylenediamine and 4-morpholino-2,6-dichloro-1,3,5-triazine, methylated (commercially available from Solvay as CYASORB® UV-3529); a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro [4.5]decane and epichlorohydrin; tetrakis(2,2,6,6-tetramethyl-4-piperidyl) butane-1,2,3,4-tetracarboxylate; 1,2,3,4-butanetetracarboxylic acid, tetrakis(1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol, 1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl) carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperidinol with higher fatty acids; 3-dodecyl-1-(2,2,6,6-tetramethyl-4-piperidyl)pyrrolidine-2,5-dione; 1H-Pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"-[1,3,5-triazine-2,4,6-triyltris[(cyclohexylimino)-2,1-ethanediyl]] tris[3,3,5,5-tetramethyl-; piperazinone, 1,1',1"-[1,3,5-triazine-2,4,6-triyltris[(cyclohexylimino)-2,1-ethanediyl]] tris[3,3,4,5,5-pentamethyl-; the reaction product of 7,7,9,9-tetramethyl-2-cycloundecyl-1-oxa-3,8-diaza-4-oxospiro [4.5]decane and epichlorohydrin; the condensate of N,N'-bis(2,2,6,6-tetramethylpiperidin-4-yl) hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro {5,5}undecane-3,3-dicarboxylic acid, bis(1,2,2,6,6-pentamethyl-4-piperidinyl): 1,5-dioxaspiro {5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed C20 to C24 alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl); 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]—; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-3-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-4-piperidinyl)amino]—; mixture of 4-hexadecyloxy- and 4-stearyloxy-2,2,6,6-tetramethylpiperidine; 3-dodecyl-1-(1,2,2,6,6-pentamethylpiperidin-4-yl)pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl) sebacate; bis(1-octyloxy-2,2,6,6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); N1-(β-hydroxyethyl)3,3-pentamethylene-5,5-dimethylpiperazin-2-one; N1-tert-octyl-3,3,5,5-tetramethyl-diazepin-2-one; N1-tert-octyl-3,3-pentamethylene-5,5-hexamethylene-diazepin-2-one; N1-tert-octyl-3,3-pentamethylene-5,5-dimethylpiperazin-2-one; trans-1,2-cyclohexane-bis-(N1-5,5-dimethyl-3,3-pentamethylene-2-piperazinone; trans-1,2-cyclohexane-bis-(N1-3,3,5,5-dispiropentamethylene-2-piperazinone); N1-isopropyl-1,4-diazadispiro-(3,3,5,5)pentamethylene-2-piperazinone; N1-isopropyl-1,4-diazadispiro-3,3-pentamethylene-5,5-tetramethylene-2-piperazinone; N1-isopropyl-5,5-dimethyl-3,3-pentamethylene-2-piperazinone; trans-1,2-cyclohexane-bis-N1-(dimethyl-3,3-pentamethylene-2-piperazinone); N1-octyl-5,5-dimethyl-3,3-pentamethylene-1,4-diazepin-2-one; N1-octyl-1,4-diazadispiro-(3,3,5,5)pentamethylene-1,5-diazepin-2-one; or TINUVIN® 880 (available from BASF).

The polymer additive portion of the stabilizer composition as described herein is specifically contemplated to include in various embodiments a combination of one or more UVA (e.g., an ortho-hydroxyphenyl triazine) and one or more HALS compound. The weight ratio of UVA compound to HALS compound (i.e., UVA:HALS) in such embodiments can be from 1:50 to 20:1, and preferably from 1:20 to 10:1; and more preferably from 1:10 to 5:1. In other embodiments, it may be preferable that the UVA portion of the stabilizer composition includes an ortho-hydroxybenzophenone compound and a HALS compound, or an ortho-hydroxyphenyl benzotriazole compound and a HALS compound in the same or similar weight ratios. In still other embodiments, it may be preferable to use a combination of the four compounds in various weight ratios disclosed herewith.

Similarly, in some embodiments the polymer additive portion of the stabilizer composition as heretofore described can include any one or more further class of co-stabilizers that include, but are not limited to, hindered benzoates, thioesters, hydroxylamines, antioxidants, hindered phenols, organophosphines, phosphites, phosphonites, benzofuranones, or nitrones. One or more co-additive known to those skilled in the art can also be included, such as, but not limited to, nucleating agents, fillers, metallic stearates, metal oxides, reinforcing agents, plasticizers, lubricants, rheology agents, catalysts, leveling agents, optical brighteners, antistatic agents, blowing agents, flame retardants, dyes, crosslinkers, slip agents, metal-deactivators, anti-scratch agents or pigments.

Suitable hindered benzoates for use with the UVA portion of the stabilizer composition include those according to Formula (VI):

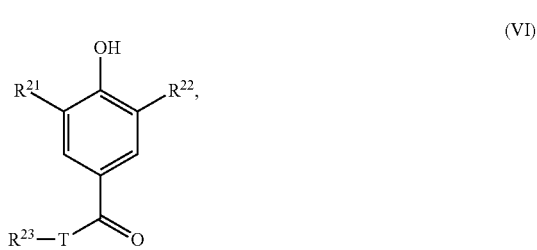

wherein the substituents of Formula (VI) are defined as follows:

each of $R^{21}$ and $R^{22}$ is independently chosen from a $C_1$-$C_{12}$ alkyl;

T is chosen from O or $NR^{24}$, where $R^{24}$ is H or a $C_1$-$C_{30}$ hydrocarbyl; and $R^{23}$ is H or a $C_1$-$C_{30}$ hydrocarbyl.

Preferred hindered benzoates can include any one or more of those commercially available from Solvay (e.g., CYASORB® UV-2908), or 2,4-di-tert-butylphenyl-3,5-di-tert-butyl-4-hydroxybenzoate; hexadecyl-3,5-di-tert-butyl-4-hydroxybenzoate; octadecyl-3,5-di-tert-butyl-4-hydroxybenzoate; octyl-3,5-di-tert-butyl-4-hydroxybenzoate; decyl-3,5-di-tert-butyl-4-hydroxybenzoate; dodecyl-3,5-di-tert-butyl-4-hydroxybenzoate; tetradecyl-3,5-di-tert-butyl-4-hydroxybenzoate; behenylyl-3,5-di-tert-butyl-4-hydroxybenzoate; 2-methyl-4,6-di-tert-butylphenyl-3,5-di-tert-butyl-4-hydroxybenzoate; or butyl-3-[3-t-butyl-4-(3,5-di-t-butyl-4-hydroxybenzoyloxy)phenyl]propionate.

Suitable thioesters, hydroxylamines, antioxidants, hindered phenols, organophosphines (also referred to as phosphines, phosphanes, or organophosphanes), phosphites, phosphonites, benzofuranones, nitrones, and co-additives include any of those disclosed in U.S. Publication Nos. 2004/0152807; 2009/0085252; 2012/0146257; and 2013/0145962; and U.S. Pat. Nos. 7,105,590; and 7,166,660, which are expressly incorporated herein by reference, or known to those skilled in the art.

Preferred hydroxylamines include, but are not limited to, any one or more of N,N-dihydrocarbylhydroxylamine chosen from: N,N-dibenzylhydroxylamine; N,N-diethylhydroxylamine; N,N-dioctylhydroxylamine; N,N-dilaurylhydroxylamine; N,N-didodecylhydroxylamine; N,N-ditetradecylhydroxylaamine; N,N-dihexadecylhydroxylamine; N,N-dioctadecylhydroxylamine; N-hexadecyl-N-tetradecylhydroxylamine; N-hexadecyl-N-heptadecylhydroxylamine; N-hexadecyl-N-octadecylhydroxylamine; N-heptadecyl-N-octadecylhydroxylamine; and N,N-di(hydrogenated tallow) hydroxylamine.

Reference has been made to this point to the stabilizer composition of the invention as up to 100% active composition (i.e., not diluted or mixed with other substances with no polymer stabilization value). However, as those skilled in the art will appreciate the granular stabilizer compositions contemplated herein can include other polymer co-additives. Accordingly, in certain embodiments the granular stabilizer compositions according to the invention can contain at least 50% of active stabilization additives; preferably at least 75%; more preferably at least 90%; and more preferably still at least 95%.

Reference has also been made to use of the stabilizer compositions according to the present invention for stabilizing an organic material. Accordingly, another aspect of the present invention provides processes for stabilizing an organic material subject to degradation and/or discoloration due to effects from light, oxygen, and/or heat, as well as the articles of manufacture thereby obtained. These processes are each achieved by adding before, during, or after processing a stabilizing amount of a stabilizer composition according to the invention as described throughout the specification and claims to the organic material to be stabilized.

In certain aspects, the invention provides processes for forming a stabilized article of manufacture, or for protecting an organic material from degradation due to the effects of light and/or heat from UV irradiation, by combining an organic material with a low-dust granular polymer stabilizer system composition as herein described. The process can further include shaping the organic material into an article of manufacture by extruding, molding, blowing, casting, thermoforming, or compacting the organic material into an article of manufacture, thereby forming a stabilized article of manufacture.

Various nonliving polymeric organic materials suitable for stabilizing include, but are not limited to, polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins (TPO), thermoplastic elastomers (TPE), aminoresin, cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, coating compositions, radiation curable compositions, epoxymelamine resins, organic dyes, cosmetic products, cellulose-based paper formulations, photographic film paper, fibers, waxes, and inks.

In certain embodiments, the nonliving polymeric organic material to be stabilized is a polyolefin. Polyolefins suitable for use with the stabilizer composition according to the invention include, but are not limited to:

(A) Polymers of monoolefins, for example polypropylene, polyisobutylene, polybut-1-ene, and poly-4-methylpent-1-ene, polymers of diolefins such as polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE);

(B) Polyolefins, i.e. the polymers of monoolefins exemplified in (A), preferably polyethylene and polypropylene, can be prepared by different, and especially by the following, methods: i) radical polymerisation (normally under high pressure and at elevated temperature); or ii) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC);

(C) Mixtures of the polymers mentioned under (A), for example mixtures of polypropylene with polyisobutylene, polypropylene with polyethylene (for example PP/HDPE, PP/LDPE) and mixtures of different types of polyethylene (for example LDPE/HDPE); and (D) Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in (A) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Particularly preferred polymeric organic materials for stabilizing and providing articles of manufacture include polyolefin polymers such as i) polymers of monoolefins chosen from polyethylene, polypropylene, polyisobutylene, polybut-1-ene, or poly-4-methylpent-1-ene; ii) polymers of diolefins chosen from polyisoprene or polybutadiene; iii) polymers of cycloolefins chosen from cyclopentene or norbornene; iv) polyethylene chosen from optionally cross-linked polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE), or ultralow density polyethylene (ULDPE); v) copolymers thereof; and vi) mixtures thereof.

Those of skill in the art will appreciate that the stabilizer compositions and processes are suitable for use with, and readily adapted to, any industrial polymeric molding process including, but not limited to, injection molding, rotomolding, blow molding, reel-to-reel molding, metal injection molding, compression molding, transfer molding, dip molding, gas assist molding, insert injection molding, micro molding, reaction injection molding, two shot injection molding, as well as any variations or combinations thereof.

The instant invention uses any suitable compaction technology or extrusion technology known to those skilled in the art to make granular low-dust polymer stabilizer system which is substantially free of a polymer resin carrier. In the present method, the compaction or extrusion process is substantially solvent free. The phrase "substantially solvent free" as used herein means that the process for making a granular stabilizer composition according to the invention is performed such that the initial powder blend comprises less than 5% by volume; preferably less than 1% by volume; more preferably less than 0.5% by volume of solvent, based on the total volume of the initial powder blend; and most preferably no solvent. This technology extends the scope of commercial application of additive blends for the polymer-producing industry.

One embodiment of the present invention involves a solventless method for processing an additive blend into granular form, comprising: mixing one or more additives with granular polymer resin without a solvent to produce a starting or initial powder blend; and processing the starting powder blend in a compaction mill using a tubular die to produce pellets.

Examples of pelleting equipment suitable for adaptation and use in the present invention include any of those apparatus and corresponding processes known to the ordinarily skilled artisan in the field of the invention, including but not necessarily limited to, those described in the following U.S. Patents, which are incorporated herein by reference: U.S. Pat. Nos. 4,446,086; 4,670,181; 4,902,210; and 5,292,461.

OTHER EMBODIMENTS

This application for patent includes at least the following embodiments:

Embodiment 1

A granular stabilizer composition comprising:

i) at least one polymer additive selected from the group consisting of UV absorbers (UVA), hindered amine light stabilizers (HALS), hindered phenol antioxidants, hindered benzoate (HB), 3-arylbenzofuranones, thioesters, N,N-disubstituted hydroxylamines, organophosphines, phosphites, and phosphonites; and ii) at least one co-active agent selected from the group consisting of alkoxylated aliphatic alcohols; alkoxylated esters of fatty acids; alkoxylated fatty amines or salts thereof; and alkoxylated fatty amides, wherein the co-active agent has a melting point from 45° C. to 100° C., wherein the granular stabilizer composition is further characterized as being low-dusting and substantially free of a carrier polymer resin.

Embodiment 2

A granular stabilizer composition according to Embodiment 1, wherein total co-active agent is present at from 10 wt. % to 90 wt. %; preferably from 25 wt. % to 75 wt. %; more preferably from 40 wt. % to 60 wt. %, based on the total weight of the stabilizer composition.

Embodiment 3

A granular stabilizer composition according to Embodiment 1 or Embodiment 2, wherein the polymer additive components have a melting point of no less than about 50° C., and the co-active agent has a melting point from 50° C. to 85° C.

Embodiment 4

A granular stabilizer composition according to any one of the preceding Embodiments, wherein the polymer additive comprises at least one UVA and at least one HALS and the ratio of UVA:HALS is in the range of 1:50 to 20:1; preferably from 1:20 to 10:1; more preferably from 1:10 to 5:1.

Embodiment 5

A granular stabilizer composition according to Embodiment 4, wherein the polymer additive further comprises at least one hindered benzoate and the ratio of UVA+HALS:HB is in the range of 1:10 to 10:1; more preferably from 1:5 to 5:1.

Embodiment 6

A granular stabilizer composition according to any one of the preceding Embodiments, wherein the UVA is selected from the group consisting of: orthohydroxyphenyl triazine compounds; orthohydroxybenzophenone compounds; orthohydroxyphenyl benzotriazole compounds; benzoxazinone compounds; and mixtures thereof.

Embodiment 7

A granular stabilizer composition according to Embodiment 6, wherein the ortho-hydroxyphenyl triazine compound is a 2-(2'-hydroxyphenyl)-1,3,5-triazine compound according to Formula (I):

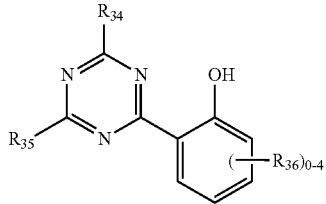

(I)

wherein
$R_{34}$ and $R_{35}$ are the same or different and are independently chosen from
  a $C_6$-$C_{10}$ aryl group optionally substituted at from 1 to 3 substitutable positions with one or more group chosen from OH, halogen, $C_1$-$C_{12}$ alkyl, $C_1$-$C_{12}$ alkoxy, $C_{1-12}$ alkoxyester, $C_{2-12}$ alkanoyl, or phenyl, wherein the phenyl is optionally substituted at from 1 to 3 substitutable positions with one or more group chosen from: hydroxyl, halogen, $C_{1-12}$ alkyl, $C_{1-12}$ alkoxy, $C_{1-12}$ alkoxyester, or $C_{2-12}$ alkanoyl;
  mono- or di-$C_1$-$C_{12}$ hydrocarbyl-substituted amino;
  $C_2$-$C_{12}$ alkanoyl;
  $C_1$-$C_{12}$ alkyl;
  $C_1$-$C_{10}$ acyl; or
  $C_1$-$C_{10}$ alkoxyl; and
$R_{36}$ is a substituent that is present at from 0 to 4 instances of the phenoxy portion of Formula (I) and in each instance is independently chosen from hydroxyl, halogen, $C_1$-$C_{12}$ alkyl, $C_1$-$C_{12}$ alkoxy, $C_1$-$C_{12}$ alkoxyester, $C_2$-$C_{12}$ alkanoyl; phenyl; or $C_1$-$C_{12}$ acyl.

Embodiment 8

A granular stabilizer composition according to Embodiment 7, wherein the 2-(2'-hydroxyphenyl)-1,3,5-triazine compound is selected from the group consisting of 4,6-bis-(2,4-dimethylphenyl)-2-(2-hydroxy-4-octyloxyphenyl)-s-triazine;
2-(4,6-Diphenyl-1,3,5-triazin-2-yl-)-5-((hexyl)oxyl-phenol;
4,6-bis-(2,4-dimethylphenyl)-2-(2,4-dihydroxyphenyl)-s-triazine;
2,4-bis(2,4-dihydroxyphenyl)-6-(4-chlorophenyl)-s-triazine;
2,4-bis[2-hydroxy-4-(2-hydroxy-ethoxy)phenyl]-6-(4-chlorophenyl)-s-triazine;
2,4-bis[2-hydroxy-4-(2-hydroxy-4-(2-hydroxy-ethoxy)phenyl]-6-(2,4-dimethylphenyl)-s-triazine;
2,4-bis[2-hydroxy-4-(2-hydroxyethoxy)phenyl]-6-(4-bromophenyl)-s-triazine;
2,4-bis[2-hydroxy-4-(2-acetoxyethoxy)phenyl]-6-(4-chlorophenyl)-s-triazine;
2,4-bis(2,4-dihydroxyphenyl)-6-(2,4-dimethylphenyl)-s-triazine;
2,4-bis(4-biphenylyl)-6-[2-hydroxy-4-[(octyloxycarbonyl)ethylideneoxy]phenyl]-s-triazine;
2,4-bis(4-biphenylyl)-6-[2-hydroxy-4-(2-ethylhexyloxy)phenyl]-s-triazine;
2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;
2,4-bis(2,4-dimethylphenyl)-6-[2-hydroxy-4(-3-benzyloxy-2-hydroxypropyloxy)phenyl]-s-triazine;
2,4-bis(2-hydroxy-4-n-butyloxyphenyl)-6-(2,4-di-n-butyloxyphenyl)-s-triazine;
2,4-bis(2,4-dimethylphenyl)-6-[2-hydroxy-4-(3-nonyloxy-2-hydroxypropyloxy)-5-α-cumylphenyl]-s-triazine;
methylenebis-{2,4-bis(2,4-dimethylphenyl)-6-[2-hydroxy-4-(3-butyloxy-2-hydroxypropoxy)phenyl]-s-triazine};
methylene bridged dimer mixture bridged in the 3:5', 5:5' and 3:3' positions in a
5:4:1 ratio;
2,4,6-tris(2-hydroxy-4-isooctyloxycarbonyliso-propylideneoxy-phenyl)-s-triazine;
2,4,6-tris(2-hydroxy-4-octyloxy-phenyl)-1,3,5-triazine;
2,4-bis(2,4-dimethylphenyl)-6-(2-hydroxy-4-hexyloxy-5-α-cumylphenyl)-s-triazine;
2-(2,4,6-trimethylphenyl)-4,6-bis[2-hydroxy-4-(3-butyloxy-2-hydroxypropyloxy)phenyl]-s-triazine;
2,4,6-tris[2-hydroxy-4-(3-sec-butyloxy-2-hydroxypropyloxy)-phenyl]-s-triazine;
mixture of 4,6-bis-(2,4-dimethylphenyl)-2-(2-hydroxy-4-(3-dodecyloxy-2-hydroxypropoxy)phenyl)-s-triazine and 4,6-bis-(2,4-dimethylphenyl)-2-(2-hydroxy-4-(3-tridecyloxy-2-hydroxypropoxy)phenyl)-s-triazine;
4,6-bis-(2,4-dimethylphenyl)-2-(2-hydroxy-4(3-(2-ethylhexyloxy)-2-hydroxypropoxy)-phenyl)-s-triazine;
4,6-diphenyl-2-(4-hexyloxy-2-hydroxyphenyl)-s-triazine; and
mixtures thereof.

Embodiment 9

A granular stabilizer composition according to Embodiment 6, wherein the orthohydroxybenzophenone compound is selected from the group consisting of 2-hydroxy-4-methoxybenzophenone; 2,2'-dihydroxy-4-methoxybenzophenone; 2-hydroxy-4-octyloxybenzophenone; 2,2'-dihydroxy-4,4'-di-methoxybenzophenone; 2,2'-dihydroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4,4'- dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxybenzophenone; 2-hydroxy-4,4',6'-tributoxybenzophenone; 2-hydroxy-4-butoxy-4',5'-dimethoxybenzophenone; 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone; 2-hydroxy-4-ethoxybenzophenone; 2-hydroxy-4-propoxybenzophenone; 2-hydroxy-4-butoxybenzophenone; 2-hydroxy-4-methoxy-4'-methylbenzophenone; 2-hydroxy-4-methoxy-4'-ethylbenzophenone; 2-hydroxy-4-methoxy-4'-propylbenzophenone; 2-hydroxy-4-methoxy-4'-butylbenzophenone; 2-hydroxy-4-methoxy-4'-tertiary butylbenzophenone; 2-hydroxy-4-methoxy-4'-chlorobenzophenone; 2-hydroxy-4-methoxy-2'-chlorobenzophenone; 2-hydroxy-4-methoxy-4'-bromobenzophenone; 2-hydroxy-4,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4,4',5'-trimethoxybenzophenone; 2-hydroxy-4-ethoxy-4'-methylbenzophenone; 2-hydroxy-4-ethoxy-4'-ethylbenzophenone; 2-hydroxy-4-ethoxy-4'-propylbenzophenone; 2-hydroxy-4-ethoxy-4'-butylbenzophenone; 2-hydroxy-4-ethoxy-4'-methoxybenzophenone; 2-hydroxy-4,4'-diethoxybenzophenone; 2-hydroxy-4-ethoxy-4'-propoxybenzophenone; 2-hydroxy-4-ethoxy-4'-butoxybenzophenone; 2-hydroxy-4-ethoxy-4'-chlorobenzophenone; 2-hydroxy-4-ethoxy-4'-bromobenzophenone; and mixtures thereof.

Embodiment 10

A granular stabilizer composition according to Embodiment 6, wherein the orthohydroxyphenyl benzotriazole compound is selected from the group consisting of 2-(2'-hydroxy-5'-methylphenyl)-benzotriazole; 2-(2'-hydroxy-5'-tert-butylphenyl)benzotriazole; 2-(2'-hydroxy-3'-methyl-5'-tert-butylphenyl)-benzotriazole; 2-(2'-hydroxy-5'-cyclohexylphenyl)-benzotriazole; 2-(2'-hydroxy-3',5'-dimethylphenyl)-benzotriazole; 2-(2'-hydroxy-5'-tert-butylphenyl)-5-chloro-benzotriazole; 2-(2'-hydroxy-5-tert-octylphenyl)-2H-benzotriazole; 2-(2'-hydroxy-5-octylphenyl)-2H-benzotriazole; 2-(3',5'-di-tert-butyl-2'-hydroxyphenyl)-5-chlorobenzotriazole; 2-(3'-tert-butyl-5'-methyl-butyl-2'hydroxyphenyl)-5-chlorobenzotriazole; 2-(3',5'-di-tert-amyl-2'-hydroxyphenyl)benzotriazole; 2-(3',5'-bis(α,α-dimethylbenzyl)-2'-hydroxyphenyl)benzotriazole; 2-(3'-tert-butyl-2'-hydroxy-5'-(2-octyloxycarbonylethyl)phenyl)benzotriazole; 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; 2-[2'-hydroxy-3'-(α,α-dimethylbenzyl)-5'-(1,1,3,3-tetramethyl-butyl)phenyl]benzotriazole; 5-trifluoromethyl-2-(2-hydroxy-3-α-cumyl-5-tert-octylphenyl)-2H-benzotriazole; 2-(2'-hydroxy-5'-(2-hydroxyethyl)phenyl)benzotriazole; 2-(2'-hydroxy-5'-(2-methacryloyloxyethyl)phenyl)benzotriazole; 2-(3'-tert-butyl-5'-methyl-2'-hydroxyphenyl)-5-chloro-benzotriazole; 2-(3'-sec-butyl-5'-tert.butyl-2'-hydroxyphenyl)-benzotriazole; 2-(3',5'-di-tert-butyl-2'-hydroxyphenyl)-benzotriazole; 2-(5'-tert-octyl-2'-hydroxyphenyl)-benzotriazole; 2-(3'-dodecyl-5'-methyl-2'-hydroxyphenyl)-benzotriazole; 2-(3'-tert-butyl-5'-(2-octyloxycarbonylethyl)-2'-hydroxyphenyl)-5-chlorobenzotriazole; 2-(5'-methyl-2'-hydroxyphenyl)-benzotriazole; 2-(5'-tert-butyl-2'-hydroxyphenyl)-benzotriazole; 2-(2'-hydroxy-3'-di-tert-butylphenyl)-benzotriazole; and mixtures thereof.

Embodiment 11

A granular stabilizer composition according to Embodiment 6, wherein the benzoxazinone compound is selected from the group consisting of: 2-methyl-3,1-benzoxazin-4-one; 2-butyl-3,1-benzoxazin-4-one; 2-phenyl-3,1-benzoxazin-4-one; 2-(1- or 2-naphthyl)-3,1-benzoxazin-4-one; 2-(4-biphenyl)-3,1-benzoxazin-4-one; 2-p-nitrophenyl-3,1-benzoxazin-4-one; 2-m-nitrophenyl-3,1-benzoxazin-4-one; 2-p-benzoylphenyl-3,1-benzoxazin-4-one; 2-p-methoxyphenyl-3,1-benzoxazin-4-one; 2-O-methoxyphenyl-3,1-benzoxazin-4-one; 2-cyclohexyl-3,1-benzoxazin-4-one; 2-p-(or m-)phthalimidephenyl-3,1-benzoxazin-4-one; N-phenyl-4-(3,1-benzoxazin-4-one-2-yl)phthalimide; N-benzoyl-4-(3,1-benzoxazine-4-one-2-yl)aniline; N-benzoyl-N-methyl-4-(3,1-benzoxazin-4-one-2-yl)-aniline; 2-[p-(N-phenylcarbamonyl)phenyl]-3,1-benzoxazin-4-one; 2-[p-(N-phenyl N-methylcarbamoyl)phenyl]-3,1-benzoxazin-4-one; 2,2'-bis(3,1-benzoxazin-4-one); 2,2'-ethylenebis(3,1-benzoxazin-4-one); 2,2'-tetramethylenebis(3,1-benzoxazin-4-one); 2,2'-hexamethylenebis(3,1-benzoxazin-4-one); 2,2'-decamethylenebis(3,1-benzoxazin-4-one); 2,2'-p-phenylenebis(3,1-benzoxazin-4-one); 2,2'-m-phenylenebis(3,1-benzoxazin-4-one); 2,2'-(4,4'-diphenylene)bis(3,1-benzoxazin-4-one); 2,2'-(2,6- or 1,5-naphthalene)bis(3,1-benzoxazin-4-one); 2,2'-(2-methyl-p-phenylene)bis(3,1-benzoxazin-4-one); 2,2'-(2-nitro-p-phenylene)bis(3,1-benzoxazin-4-one); 2,2'-(2-chloro-p-phenylene)bis(3,1-benzoxazin-4-one); 2,2'-(1,4-cyclohexylene)bis(3,1-benzoxazin-4-one); N-p-(3,1-benzoxazin-4-on-2-yl)phenyl; 4-(3,1-benzoxazin-4-on-2-yl)phthalimide; N-p-(3,1-benzoxazin-4-on-2-yl)benzoyl; 4-(3,1-benzoxazin-4-on-2-yl)aniline; 1,3,5-tri(3,1-benzoxazin-4-on-2-yl)benzene; 1,3,5-tri(3,1-benzoxazin-4-on-2-yl)naphthalene; 2,4,6-tri(3,1-benzoxazin-4-on-2-yl)naphthalene; and mixtures thereof.

Embodiment 12

A granular stabilizer composition according to any one of the preceding Embodiments, wherein the hindered amine light stabilizer compound (HALS) comprises:

i) a functional group according to Formula (II):

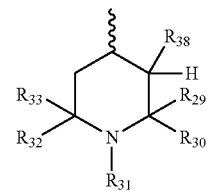

(II)

wherein $R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy;

R$_{38}$ is chosen from: hydrogen; or C$_1$-C$_8$ hydrocarbyl; and
each of R$_{29}$, R$_{30}$, R$_{32}$, and R$_{33}$ is independently chosen from C$_1$-C$_{20}$ hydrocarbyl, or R$_{29}$ and R$_{30}$ and/or R$_{32}$ and R$_{33}$ taken together with the carbon to which they are attached form a C$_5$-C$_{10}$ cycloalkyl; or ii) a functional group according to Formula (IIa):

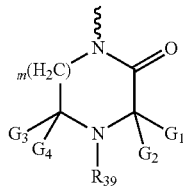

(IIa)

wherein
m is an integer from 1 to 2;
R$_{39}$ is chosen from: hydrogen; OH; C$_1$-C$_{20}$ hydrocarbyl; —CH$_2$CN; C$_1$-C$_{12}$ acyl; or C$_1$-C$_{18}$ alkoxy; and
each of G$_1$-G$_4$ is independently chosen from C$_1$-C$_{20}$ hydrocarbyl; or iii) mixtures of functional groups according to Formula (II) and Formula (IIa).

Embodiment 13

A granular stabilizer composition according to Embodiment 12, wherein the HALS compound is selected from the group consisting of: bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl) sebacate; bis(1-octyloxy-2,2,6,6-tetramethylpiperidin-4-yl) sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine; a condensate of N,N'-bis(2,2,6,6-tetramethylpiperidin-4-yl)hexamethylenediamine and 4-morpholino-2,6-dichloro-1,3,5-triazine, methylated; a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a mixture of 4-hexadecyloxy- and 4-stearyloxy-1,2,2,6,6-pentamethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis (2,2,6,6-tetramethyl-4-piperidyl) butane-1,2,3,4-tetracarboxylate; 1,2,3,4-butanetetracarboxylic acid, tetrakis(1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol, 1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl)carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperidinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperidinol with higher fatty acids; 3-dodecyl-1-(2,2,6,6-tetramethyl-4-piperidyl)pyrrolidine-2,5-dione; 1H-Pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"-[1,3,5-triazine-2,4,6-triyltris[(cyclohexylimino)-2,1-ethanediyl]]tris[3,3,5,5-tetramethyl-; piperazinone, 1,1',1"-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro {5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]—; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-3-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]—; mixture of 4-hexadecyloxy- and 4-stearyloxy-2,2,6,6-tetramethylpiperidine; 3-dodecyl-1-(1,2,2,6,6-pentamethylpiperidin-4-yl)pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl) sebacate; bis(1-octyloxy-2,2,6,6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); N1-(β-hydroxyethyl)3,3-pentamethylene-5,5-dimethylpiperazin-2-one; N1-tert-octyl-3,3,5,5-tetramethyl-diazepin-2-one; N1-tert-octyl-3,3-pentamethylene-5,5-hexamethylene-diazepin-2-one; N1-tert-octyl-3,3-pentamethylene-5,5-dimethylpiperazin-2-one; trans-1,2-cyclohexane-bis-($N^1$-5,5-dimethyl-3,3-pentamethylene-2-piperazinone; trans-1,2-cyclohexane-bis-($N^1$-3,3,5,5-dispiropentamethylene-2-piperazinone); N-isopropyl-1,4-diazadispiro-(3,3,5,5)pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentamethylene-1,4-diazepin-2-one; $N^1$-octyl-1,4-diazadispiro-(3,3,5,5)pentamethylene-1,5-diazepin-2-one; TINUVIN® 880; and mixtures thereof.

Embodiment 14

A granular stabilizer composition according to any one of the preceding Embodiments, wherein the hindered benzoate compound is according to Formula (VI):

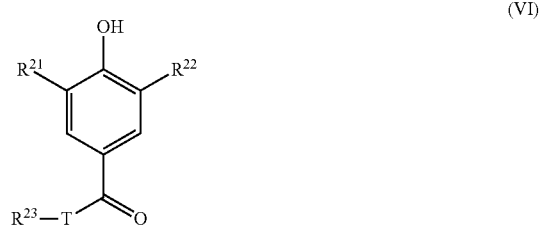

wherein
each of $R^{21}$ and $R^{22}$ is independently chosen from a $C_1$-$C_{12}$ alkyl;
T is chosen from O or $NR^{24}$, where $R^{24}$ is H or a $C_1$-$C_{30}$ hydrocarbyl; and
$R^{23}$ is H or a $C_1$-$C_{30}$ hydrocarbyl.

Embodiment 15

A granular stabilizer composition according to Embodiment 14, wherein the hindered benzoate compound is selected from the group consisting of 2,4-di-tert-butylphenyl-3,5-di-tert-butyl-4-hydroxybenzoate; hexadecyl-3,5-di-tert-butyl-4-hydroxybenzoate; octadecyl-3,5-di-tert-butyl-4-hydroxybenzoate; octyl-3,5-di-tert-butyl-4-hydroxybenzoate; decyl-3,5-di-tert-butyl-4-hydroxybenzoate; dodecyl-3,5-di-tert-butyl-4-hydroxybenzoate; tetradecyl-3,5-di-tert-butyl-4-hydroxybenzoate; behenylyl-3,5-di-tert-butyl-4-hydroxybenzoate; 2-methyl-4,6-di-tert-butylphenyl-3,5-di-tert-butyl-4-hydroxybenzoate; butyl-3-[3-t-butyl-4-(3,5-di-t-butyl-4-hydroxybenzoyloxy)phenyl]propionate; and mixtures thereof.

Embodiment 16

A granular stabilizer composition according to any one of the preceding Embodiments, wherein the hindered phenol compound comprises a molecular fragment according to one or more of Formula (IVa), (IVb), or (IVc):

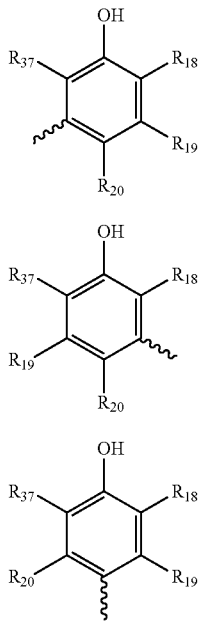

wherein $R_{18}$ in each of Formula (IVa), (IVb), and (IVc) is chosen from hydrogen or a $C_{1-4}$ hydrocarbyl;

each of $R_{19}$ and $R_{20}$ in Formula (IVa), (IVb), and (IVc) is individually chosen from hydrogen or a $C_1$-$C_{20}$ hydrocarbyl; and $R_{37}$ in each of Formula (IVa), (IVb), and (IVc) is chosen from $C_1$-$C_{12}$ hydrocarbyl.

Embodiment 17

A granular stabilizer composition according to Embodiment 16, wherein $R_{18}$ and $R_{37}$ in each of Formula (IVa), (IVb), and (IVc) are independently chosen from methyl or t-butyl.

Embodiment 18

A granular stabilizer composition according to Embodiment 16 or Embodiment 17, wherein the at least one hindered phenol compound is selected from the group consisting of (1,3,5-Tris(4-t-butyl-3-hydroxy-2,6-dimethylbenzyl)-1,3,5-triazine-2,4,6-(1H,3H,5H)-trione; 1,3,5-tris(3,5-di-tert-butyl-4-hydroxybenzyl)-1,3,5-triazine-2,4,6(1H,3H,5H)-trione; 1,1,3-Tris(2'-methyl-4'-hydroxy-5'-t-butylphenyl)butane; Triethylene glycol bis[3-(3-t-butyl-4-hydroxy-5-methylphenyl)propionate]; 4,4'-Thiobis(2-t-butyl-5-methylphenol); 2,2'-Thiodiethylene bis[3-(3-t-butyl-4-hydroxyl-5-methylphenyl)propionate]; Octadecyl 3-(3'-t-butyl-4'-hydroxy-5'-methylphenyl)propionate; Tetrakismethylene(3-t-butyl-4-hydroxy-5-methylhydrocinnamate)methane; N,N'-Hexamethylene bis[3-(3-t-butyl-4-hydroxy-5-methylphenyl)propionamide]; Di(4-tertiarybutyl-3-hydroxy-2,6-dimethyl benzyl) thiodipropionate; and octadecyl 3,5-di-(tert)-butyl-4-hydroxyhydrocinnamate.

Embodiment 19

A granular stabilizer composition according to any one of the preceding Embodiments, wherein the phosphite or phosphonite is selected from the group consisting of i) a compound according to Formulas 1-7:

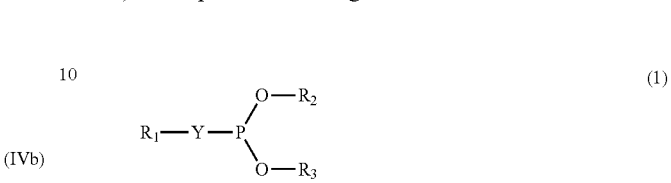

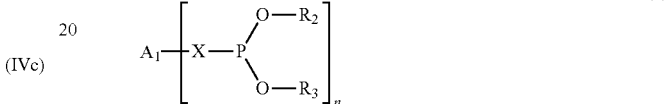

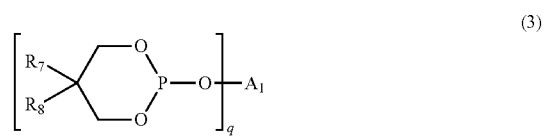

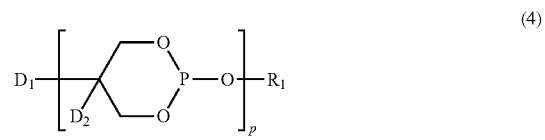

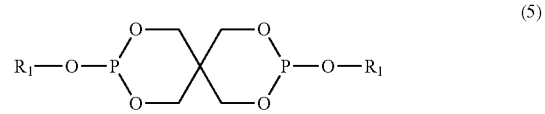

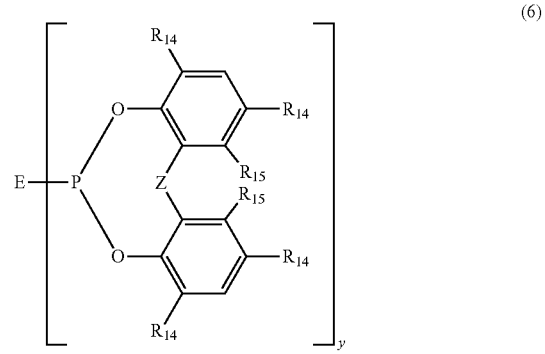

-continued

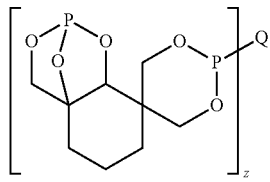
(7)

in which the indices are integral and
n is 2, 3 or 4; p is 1 or 2; q is 2 or 3; r is 4 to 12; y is 1, 2 or 3; and z is 1 to 6;

$A_1$, if n is 2, is $C_2$-$C_{18}$ alkylene; $C_2$-$C_{12}$ alkylene interrupted by oxygen, sulfur or —$NR_4$—; a radical of the formula

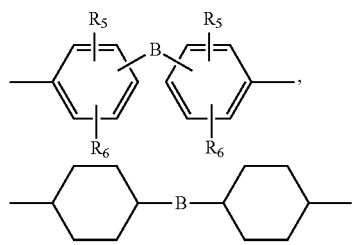

or phenylene;

$A_1$, if n is 3, is a radical of the formula —$C_rH_{2r-1}$—;

$A_1$, if n is 4, is

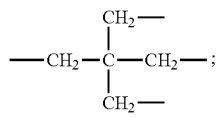

B is a direct bond, —$CH_2$—, —$CHR_4$—, —$CR_1R_4$—, sulfur, $C_5$-$C_7$ cycloalkylidene, or cyclohexylidene which is substituted by from 1 to 4 $C_1$-$C_4$ alkyl radicals in position 3, 4 and/or 5;

$D_1$, if p is 1, is $C_1$-$C_4$ alkyl and, if p is 2, is —$CH_2OCH_2$—;

$D_2$ is $C_1$-$C_4$ alkyl;

E, if y is 1, is $C_1$-$C_{18}$ alkyl, —$OR_1$ or halogen;

E, if y is 2, is —O-$A_2$-O—, wherein $A_2$ is as defined for $A_1$ when n is 2;

E, if y is 3, is a radical of the formula $R_4C(CH_2O—)_3$ or $N(CH_2CH_2O—)_3$;

Q is the radical of an at least z-valent mono or poly alcohol or phenol, this radical being attached via the oxygen atom of the OH group of the mono or poly alcohol or phenol to the phosphorus atom;

$R_1$, $R_2$ and $R_3$ independently of one another are $C_1$-$C_{18}$ alkyl which is unsubstituted or substituted by halogen, —$COOR_4$, —CN or —$CONR_4R_4$; $C_2$-$C_{18}$ alkyl interrupted by oxygen, sulfur or —$NR_4$—; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$-$C_9$ phenylalkyl; or a radical of the formula

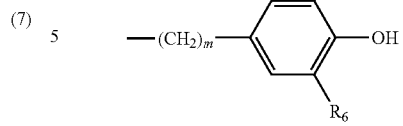

in which m is an integer from the range 3 to 6;

$R_4$ is hydrogen, $C_1$-$C_8$ alkyl, $C_5$-$C_{12}$ cycloalkyl or $C_7$-$C_9$ phenylalkyl, $R_5$ and $R_6$ independently of one another are hydrogen, $C_1$-$C_8$ alkyl or $C_5$-$C_6$ cycloalkyl, $R_7$ and $R_8$, if q is 2, independently of one another are $C_1$-$C_4$ alkyl or together are a 2,3-dehydropentamethylene radical; and $R_7$ and $R_8$, if q is 3, are methyl;

each instance of $R_{14}$ is independently chosen from hydrogen, $C_1$-$C_9$ alkyl or cyclohexyl, each instance of $R_{15}$ is independently chosen from hydrogen or methyl, X and Y are each a direct bond or oxygen, Z is a direct bond, methylene, —$C(R_{16})_2$— or sulfur, and $R_{16}$ is $C_1$-$C_8$ alkyl;

ii) a trisarylphosphite according to Formula 8:

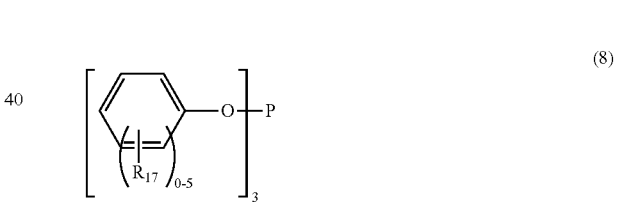
(8)

wherein $R_{17}$ is present at from 0 to 5 positions of the aromatic portion of Formula 8 and in each instance is independently chosen from $C_1$-$C_{20}$ alkyl, $C_3$-$C_{20}$ cycloalkyl, $C_4$-$C_{20}$ alkyl cycloalkyl, $C_6$-$C_{10}$ aryl, or $C_7$-$C_{20}$ alkylaryl; and iii) combinations of (i) and (ii).

Embodiment 20

A granular stabilizer composition according to Embodiment 19, wherein the organic phosphite or phosphonite is selected from the group consisting of triphenyl phosphite; diphenyl alkyl phosphites; phenyl dialkyl phosphites; trilauryl phosphite; trioctadecyl phosphite; distearyl pentaerythritol phosphite; tris(2,4-di-tert-butylphenyl) phosphite; tris(nonylphenyl) phosphite; a compound of formulae (A), (B), (C), (D), (E), (F), (G), (H), (J), (K) and (L):

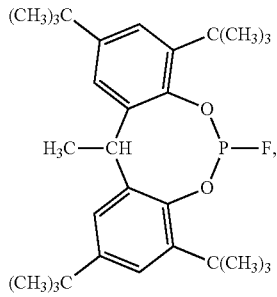
(A)
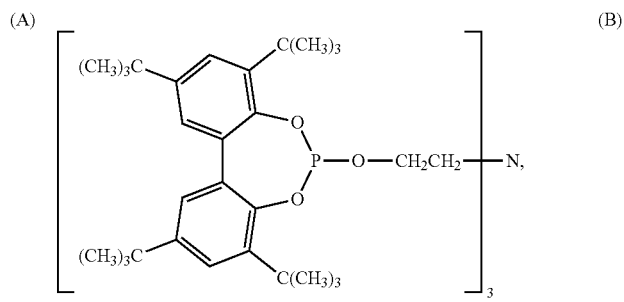
(B)
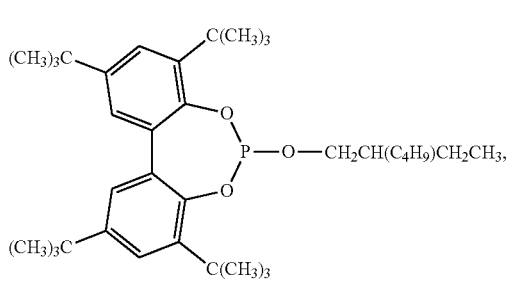
(C)
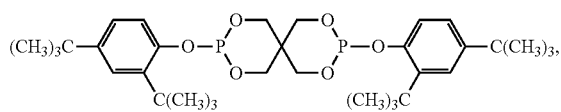
(D)
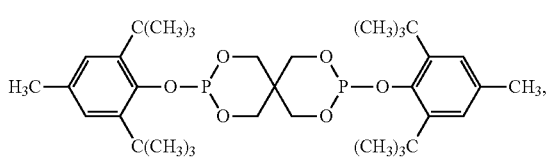
(E)
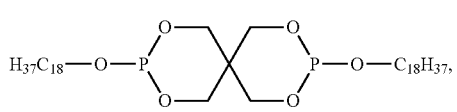
(F)
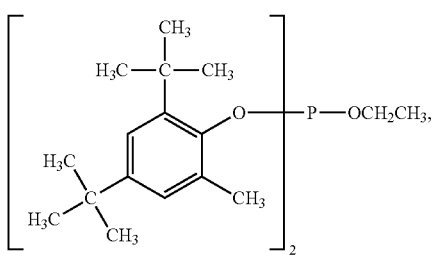
(G)
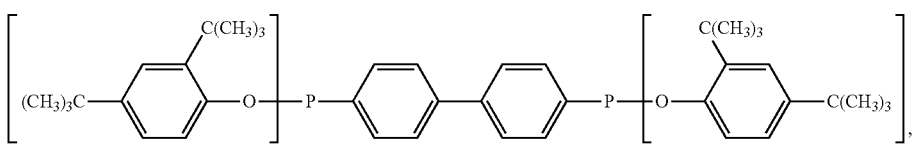
(H)
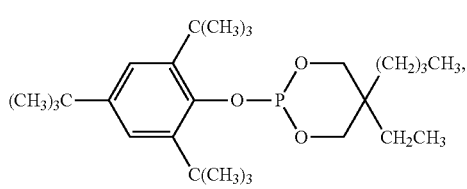
(J)
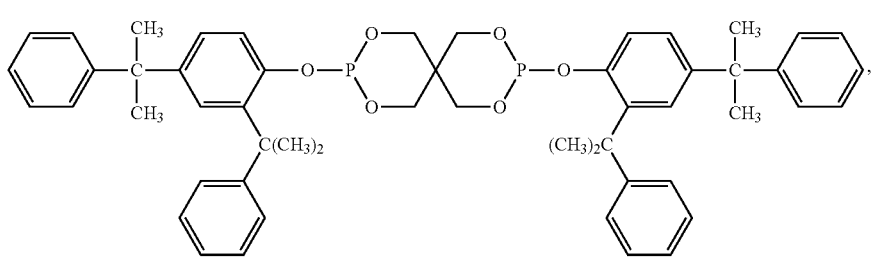
(K)

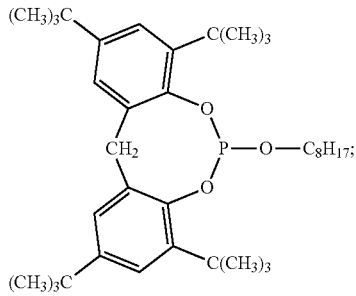

(L)

2-butyl-2-ethyl-1,3-propanediol 2,4,6-tri-t-butylphenol phosphite; bis-(2,6-di-t-butyl-4-methlphenyl) pentaerythritol diphosphite; 2-butyl-2-ethyl-1,3-propanediol 2,4-dicumylphenol phosphite; 2-butyl-2-ethyl-1,3-propanediol 4-methyl-2,6-di-t-butylphenol phosphite; bis-(2,4,6-tri-t-butyl-phenyl) pentaerythritol diphosphite; and combinations thereof.

Embodiment 21

A granular stabilizer composition according to Embodiment 19, wherein the hindered arylalkyl phosphite is selected from the group consisting of: bis-(2,6-di-t-butyl-4-methlphenyl)pentaerythritol diphosphite; (bis-(2,4-dicumylphenyl)pentaerythritol diphosphite; bis-(2,4-di-t-butyl-phenyl)pentaerythritol diphosphite; and bis-(2,4,6-tri-t-butyl-phenyl)pentaerythritol diphosphite.

Embodiment 22

A granular stabilizer composition according to Embodiment 19, wherein the trisarylphosphite is selected from the group consisting of:
tris-(2,4-di-t-butylphenyl)phosphite;
tris(4-nonylphenyl) phosphite; and
triphenyl phosphite.

Embodiment 23

A granular stabilizer composition according to any one of the preceding Embodiments, wherein the thioester compound is selected from the group consisting of: dilauryl thiodipropionate; distearyl thiodipropionate; pentaerythritol tetrakis-(3-dodecylthipropionate); tetra-alkyl thioethyl thiodisuccinate; 2,12-dihydroxy-4,10-dithia-7-oxatridecamethylene bis[3-(dodecylthio)propionate]; polyalkanol esters of alkylthio-alkanoic acids; dialkyl 3,3'-thiodipropionates; and mixtures thereof.

Embodiment 24

A granular stabilizer composition according to any one of the preceding Embodiments, wherein the co-active agent comprises an alkoxylated alcohol according to Formula (III):

R—(OCHR'CH$_2$)$_y$—OH  (III)

wherein
R of Formula (III) is a hydrocarbyl group having from 12 to 60 carbon atoms;
R' of Formula (III) is chosen from H or C$_1$-C$_4$ alkyl; and
y is an integer from 1 to 100.

Embodiment 25

A granular stabilizer composition according to any one of the preceding Embodiments, wherein the co-active agent comprises an alkoxylated ester of fatty acid according to Formula (IIIa):

RCO—(OCHR'CH$_2$)$_y$—OH  (IIIa)

wherein
R of Formula (IIIa) is a hydrocarbyl group having from 12 to 60 carbon atoms;
R' of Formula (IIIa) is chosen from H or C$_1$-C$_4$ alkyl; and
y is an integer from 1 to 100.

Embodiment 26

A granular stabilizer composition according to Embodiment 24 or Embodiment 25, wherein R of Formula (III) or (IIIa) has from 12 to 30 carbon atoms and y of Formula (III) or (IIIa) is an integer from 2 to 60.

Embodiment 27

A granular stabilizer composition according to any one of Embodiment 24 to Embodiment 27, wherein the compound according to Formula (III) or (IIIa) is ethoxylated alcohol or ethoxylated ester of a fatty acid.

Embodiment 28

A granular stabilizer composition according to any one of the preceding Embodiments, wherein the co-active agent comprises
i) an alkoxylated fatty amine compound according to Formula (V)

R$^4$—NR$^2$R$^3$  (V), or salt thereof,
or
ii) an alkoxylated fatty amide compound according to Formula (Va):

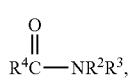  (Va)

wherein
R$^4$ of Formula (V) and Formula (Va) is chosen from a C$_8$-C$_{60}$ hydrocarbyl group, optionally interrupted with one or more hetero atoms; and each of $R^2$ and $R^3$ of Formula (V) and Formula (Va) is independently chosen from H, a $C_1$-$C_{30}$ alkyl, or (—$CH_2CHR^5O$-)n-H, wherein $R^5$ is chosen from H or methyl, and n is an integer from 1 to 100; and wherein at least one of $R^2$ or $R^3$ of Formula (V) and Formula (Va) is chosen from (—$CH_2CHRO$-)n-H.

Embodiment 29

A granular stabilizer composition according to Embodiment 28, wherein $R^4$ of Formula (V) and Formula (Va) is a $C_8$-$C_{36}$ alkyl group, optionally interrupted by one or more hetero atom.

Embodiment 30

A granular stabilizer composition according to Embodiment 29, wherein $R^4$ of Formula (V) and Formula (Va) is a $C_{12}$-$C_{30}$ alkyl group, optionally interrupted with one or more hetero atom.

Embodiment 31

A granular stabilizer composition according to any one of Embodiments 28 to 30, wherein the total value of n is an integer from 1 to 10.

Embodiment 32

A granular stabilizer composition according to any one of Embodiments 28 to 31, wherein the co-active agent is an alkoxylated fatty amine compound according to Formula (V) selected from the group consisting of: ethoxylated and/or propoxylated stearyl amines; oleyl amines; tallow amines; cetyl amines; capryl amines; hydrogenated tallow amines; cocoamines; salts thereof; and mixtures thereof.

Embodiment 33

A granular stabilizer composition according to any one of Embodiments 28 to 32, wherein the co-active agent is a carboxylic acid salt of the alkoxylated fatty amine compound according to Formula (V).

Embodiment 34

A granular stabilizer composition according to Embodiment 33, wherein the carboxylic acid salt is derived from a $C_2$-$C_{30}$ carboxylic acid.

Embodiment 35

A granular stabilizer composition according to Embodiment 34, wherein the carboxylic acid salt is derived from a $C_{12}$-$C_{24}$ carboxylic acid.

Embodiment 36

A granular stabilizer composition according to any one of Embodiments 28 to 31, wherein the co-active agent is an alkoxylated fatty amide compound according to Formula (Va) selected from the group consisting of cocoamide monoethanol amine; cocoamide diethanol amine; cocoamide ethoxylates; lauramide diethanol amine; oleamide diethanol amine; oleic acid monoethanol amide; and mixtures thereof.

Embodiment 37

A granular stabilizer composition according to any one of the preceding Embodiments, wherein the stabilizer composition contains less than 10 wt. % of carrier polymer resin based on the total weight of the stabilizer composition; preferably less than 5 wt. %; more preferably less than 0.5 wt. %; and most preferably contains no carrier polymer resin.

Embodiment 38

A polymer resin composition comprising a polymer resin and a granular stabilizer composition as defined by any one of Embodiments 1 to 37.

Embodiment 39

Use of a granular stabilizer composition as defined by any one of Embodiments 1 to 37 for stabilizing a polymer resin.

Embodiment 40

The invention according to Embodiment 38 or Embodiment 39, wherein the polymer resin is selected from the group consisting of polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins, aminoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, coating compositions, radiation curable compositions, epoxymelamine resins, and mixtures thereof.

Embodiment 41

The invention according to Embodiment 40, wherein the polymer resin is a polyolefin polymer selected from the group consisting of i) polymers of monoolefins chosen from polyethylene, polypropylene, polyisobutylene, polybut-1-ene, or poly-4-methylpent-1-ene; ii) polymers of diolefins chosen from polyisoprene or polybutadiene; iii) polymers of cycloolefins chosen from cyclopentene or norbornene; iv) polyethylene chosen from optionally crosslinked polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE), or ultralow density polyethylene (ULDPE); v) copolymers thereof; and vi) mixtures thereof.

Embodiment 42

A process for making a granular stabilizer composition according to any one of Embodiments 1 to 37, the method comprising the steps of:
(a) mixing at least one polymer additive as defined by any one of Embodiments 1 to 37 with at least one co-active agent as defined by any one of Embodiments 1 to 37 to produce a homogenous initial powder blend, wherein the initial powder blend is substantially solvent-free;
(b) compacting the initial powder blend; and
(c) granulating the compacted material.

Embodiment 43

A process for making a granular stabilizer composition according to any one of Embodiments 1 to 37, the method comprising the steps of:
(a) mixing at least one polymer additive as defined by any one of Embodiments 1 to 37 with at least one co-active agent as defined by any one of Embodiments 1 to 37 to produce a homogenous initial powder blend, wherein the initial powder blend is substantially solvent-free;
(b) extruding the initial powder blend; and
(c) granulating the extruded material.

Embodiment 44

A process according to Embodiment 42 or Embodiment 43, wherein the initial powder blend comprises less than 5%; preferably less than 1%; more preferably less than 0.5% solvent; and most preferably no solvent.

Examples

The following examples are provided to assist one skilled in the art to further understand certain embodiments of the present invention. These examples are intended for illustration purposes and are not to be construed as limiting the scope of the various embodiments of the present invention.

Example 1: Process for Manufacturing Compacted, Granular Stabilizer System

For compaction and granulation, Hosokawa Alpine Pharmapaktor Model L200/50 P and Flake Crusher Model FC 200 are used. In addition a Hosokawa Alpine Universal Mill Model 315 UPZ is used to reduce the size of a number of the components for the various formulations. A Vrieco-Nauta® Conical Screw Mixer Model 200 DBX is used to mix the various components to make up the different formulations to be tested.
Procedure:
Hosokawa Alpine Pharmapaktor Model L200/50 P and Flake Crusher Model FC 200
A brief description of the Hosokawa Alpine Pharmapaktor Model L200/50 P system is as follows: Material is manually charged into a feed hopper, where a cylindrical screw is used to meter the material into the feed throat of the compactor. The material is fed into the compaction area (nip area) that is located between two counter rotating compacting rolls, which are fixed in position. The material is then compressed by the two rotating compacting rolls. The speed of the rolls and feed screw are adjusted to affect the hardness of the flakes. Directly after compaction, the material falls into the Hosokawa Alpine Flake Crusher Model FC 200. The Flake Crusher consists of a rotating element and screen. The size reduction is accomplished by the rotor pushing the material into the screen. The capacity, particle size range and crushing intensity are controlled by the speed of the rotor while the screen controls the maximum particle size of the product.
Vrieco-Nauta® Conical Screw Mixer Model 200 DBX
A brief description of the Vrieco-Nauta® Conical Screw Mixer Model 200 DBX is as follows. Material is manually charged into the mixing vessel through a port in the top cover of the unit. The material is then mixed by a mixing screw, which transports the material from below and the sides, up along the wall of the mixing vessel. At the same time, the rotating orbit arm guides the rotating mixing screw continuously along the wall of the vessel and causes an uninterrupted exchange of material parts between the mixing screw and the material mass. After mixing is completed the material is then discharged through a ball segment valve into a collection bin below the unit.
Hosokawa Alpine Fine Impact Mill Model 315 UPZ(Ultraplex)
A brief description of the Hosokawa Alpine Universal Mill Model 315 UPZ is as follows. Material is manually charged into the hopper of a screw feeder, which conveys the material via gravity into the grind chamber of the UPZ. Once in the grinding section, material is ground between one rotating and one stationary disc. Various grinding media can be used to grind material (i.e. plate beater, pin rotor, swing beater and beater disc). These can also be used in conjunction with different types of tracks and screens. Once ground, the material is gravity conveyed into the hopper located beneath the mill and collected in a drum. Various rotors and rotor speeds can be used to attain the desired grind.

The Mikro Air Jet Sieve (MAJS) is used to measure the particle size distribution of the compacted and granulated product using the following screens: 5, 10, 14, 20, 40 and 60 Mesh.

The following formulations are prepared using milled polymer additives, viz., CYASORB UV-1164, TINUVIN 770 and CYASORB UV-2908; and co-active agents LEUNAPON F1618/55 (an ethoxylated alcohol), GMS-40 (glycerol monostearate with 40% monoester) (comparative) and cetyl alcohol (comparative) and one formulation is prepared as control, just with CYASORB UV-1164 and TINUVIN 770 (no co-active agent). The compounds were milled using Hosokawa's Alpine UPZ fine impact mill. The blended formulations were compacted using smallest screw to prevent melting.
(a). Control Formulation: CYASORB UV-1164 (7.7%), TINUVIN 770 (61.5%) and CYASORB UV-2908 (30.8%).
(b). Leunapon Formulation: CYASORB UV-1164 (3.9%), TINUVIN 770 (30.8%), CYASORB UV-2908 (15.3%) and LEUNAPON F 1618/55 (50.00%).
(c). GMS-40 Formulation: CYASORB UV-1164 (3.9%), TINUVIN 770 (30.8%), CYASORB UV-2908 (15.3%) and GMS-40 (50.00%).
(d). Cetyl alcohol Formulation: CYASORB UV-1164 (3.9%), TINUVIN 770 (30.8%), CYASORB UV-2908 (15.3%) and cetyl alcohol (50.00%).

After the compaction, the granular materials are screened on 1181 microns screen. Fines generated in each case are weighed and percent fines determined. The results summarized below in Table 1 show formulation with LEUNAPON F 1618/55 generated the lowest fines:

TABLE 1

| Formulation | Percent Fines |
| --- | --- |
| (a). Control | 15.6 |
| (b). Leunapon | 7.7 |
| *(c). GMS-40 | 12.9 |
| *(d). Cetyl alcohol | 14.7 |

*comparative.

Figure 2:
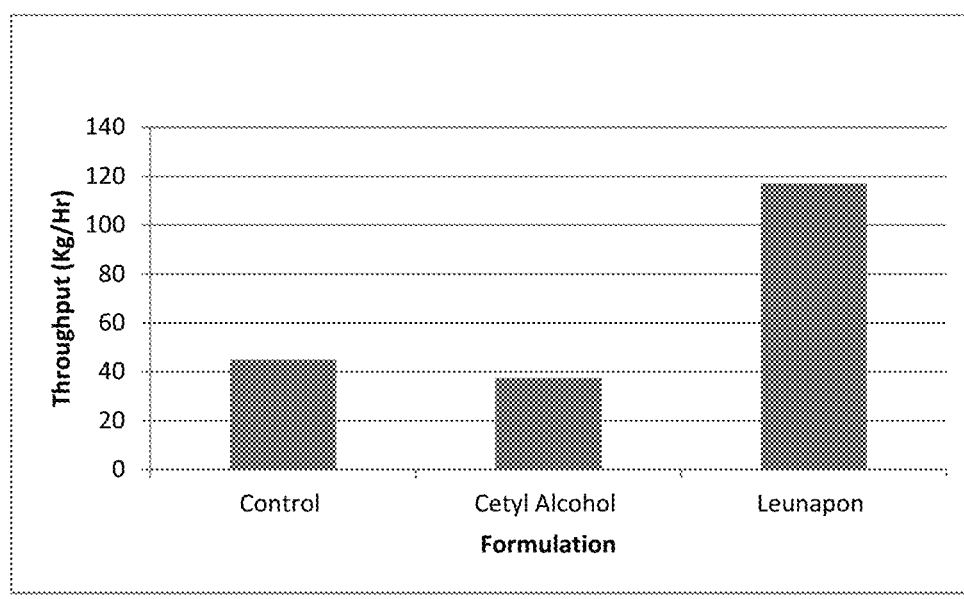
FIG. 2 is a graph demonstrating the compaction throughput (in kilograms per hour) of the formulations (a), (b), and (d) described in Example 1.

As demonstrated in the figures herewith, the formulation containing LEUNAPON F 1618/55 has significantly higher throughput (more than 50% higher) in the compaction process as compared to formulations with no co-active agent (control), or with GMS-40 (FIG. 1); or as compared to formulations with no co-active agent (control), or with cetyl alcohol (FIG. 2).

Example 2: Evaluation of Friability During Transportation: Shaker Test (Red Devil Shaker—Model #5400) and Roller Test A test is designed to evaluate the friability of the compacted materials of various formulations described above. The problem occurs when during transportation and shipping some stabilizers or stabilizer blends can become friable, producing a significant amount of fines that may not be acceptable to the end user.

The testing procedure developed for Shaker test is as follows: Weigh the empty glass jar prior to filling it with the additive, record the value and tare the balance. Using an open mouthed 16 oz., jar, fill so it is ⅓ filled. (Roughly 140 grams for pellets). Take care to avoid adding powder to the jar. Close glass jar with the appropriate lid. Place the jar on a Red Devil Shaker (Model #5400) and securely tighten the clamp by screwing the base upward to ensure that the sample jar does not inadvertently loosen during the shaking process. Set the timer to 5 minutes.

After the 5 minutes, remove the sample jar and using a 35 mesh (0.011 inch wire diameter—0.0175 inch opening) screen, empty the contents of the jar through the screen onto a foil tray. Record the weight of powder that is collected in the tray. Weigh the glass jar and subtract the initial weight of the jar. Add both the weights of "powder in the tray" and "residual on glass". This is the total weight in fines after 5 minutes of shaking.

Another test to check the friability, called Roller test, can be done. This Roller Test simulates the friability of products during transportation on smooth road conditions.

The testing procedure developed for Roller test is as follows:

Weigh the empty glass jar prior to filling it with the additive, record the value and tare the balance.

Fill an open mouthed 16 oz. glass jar until it is about ⅓ filled. (Roughly 140 grams).

Close the glass jar with an appropriate lid and secure it with an electrical tape.

Place the sealed jar on a Norton Roller—Model CV69302.

After rotating for 30 min, turn off the Norton Roller, take the jar and remove the electrical tape.

Open the lid, pour the contents of the jar through a 35 mesh (0.011 inch wire diameter—0.0175 inch opening) screen into a tray.

Record the weight of powder that is collected in the tray.

Weigh the glass jar and subtract the initial weight of the jar.

Add both the weights of "powder in the tray" and "residual on glass". This is the total weight of fines after 30 minutes of rolling. Determine the percent fines in the roller test.

The results for both Shaker test and Roller test for granular products made using the four formulations described in Example 1 are summarized below in Table 2, which show that the lowest fines, the best performance, is observed with LEUNAPON F 1618/55 formulation in both tests:

TABLE 2

| Formulation | Shaker Test Fines (%) | Roller Test Fines (%) |
| --- | --- | --- |
| (a). Control | 11.6 | 3.1 |
| (b). Leunapon | 2.5 | 0.9 |
| *(c). GMS-40 | 4.3 | 1.6 |
| *(d). Cetyl alcohol | 3.4 | 1.3 |

*comparative.

Example 3: Production of Compacted, Granular Stabilizer System (e) for a Thermoplastic Polymer A granular stabilizer formulation (e) containing CYASORB UV-1164 (5.56%), TINUVIN 770 (44.44%) and LEUNAPON F 1618/55 (50%) is prepared and compacted using Hosakawa's method as described in Example 1.

Similar to the LEUNAPON F 1618/55 formulation in Example 1, the throughput for the compacted stabilizer material (e) was superior, 145 Kg/hr.

The resulting compacted material was tested using the Shaker test method as described in Example 2. The percent fines is determined to be 2.7%.

Example 4: Production of Compacted, Granular Stabilizer System (f) for a Thermoplastic Polymer A granular stabilizer formulation (f) is obtained in the same manner of Example 3, except that CYASORB UV-1164 is replaced by same amount of CYASORB UV-5411 (a benzotriazole UV absorber). The throughput for the compacted stabilizer material (f) and percent fines measured provide results similar to those of the compacted stabilizer material (e) in Example 3.

Various patent and/or scientific literature references have been referred to throughout this application. The disclosures of these publications in their entireties are hereby incorporated by reference as if written herein. In view of the above description and the examples, one of ordinary skill in the art will be able to practice the disclosure as claimed without undue experimentation.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

The invention claimed is:
1. A granular stabilizer composition comprising:
i) at least one polymer additive selected from the group consisting of UV absorbers (UVA), hindered amine light stabilizers (HALS), hindered phenol antioxidants, hindered benzoate (HB), 3-arylbenzofuranones, thioesters, N,N-disubstituted hydroxylamines, organophosphines, phosphites, and phosphonites; and
ii) at least one co-active agent selected from the group consisting of alkoxylated aliphatic alcohols; alkoxylated esters of fatty acids; alkoxylated fatty amines or salts thereof; and alkoxylated fatty amides, wherein the co-active agent has a melting point from 45° C. to 100° C.,
wherein the granular stabilizer composition is further characterized as being provided in a low-dusting, compacted form, and substantially free of a carrier polymer resin.

2. A granular stabilizer composition according to claim 1, wherein total co-active agent is present at from 10 wt. % to 90 wt., based on the total weight of the stabilizer composition.

3. A granular stabilizer composition according to claim 1, wherein the polymer additive components have a melting point of no less than about 50° C., and the co-active agent has a melting point from 50° C. to 85° C.

4. A granular stabilizer composition according to claim 1, wherein the polymer additive comprises at least one UVA and at least one HALS and the ratio of UVA:HALS is in the range of 1:50 to 20:1.

5. A granular stabilizer composition according to claim 4, wherein the polymer additive further comprises at least one hindered benzoate and the ratio of UVA+HALS:HB is in the range of 1:10 to 10:1.

6. A granular stabilizer composition according to claim 1, wherein the UVA is selected from the group consisting of: orthohydroxyphenyl triazine compounds; orthohydroxybenzophenone compounds; orthohydroxyphenyl benzotriazole compounds; benzoxazinone compounds; and mixtures thereof.

7. A granular stabilizer composition according to claim 6, wherein the ortho-hydroxyphenyl triazine compound is a 2-(2'-hydroxyphenyl)-1,3,5-triazine compound according to Formula (I):

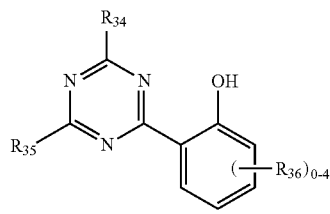

wherein
$R_{34}$ and $R_{35}$ are the same or different and are independently chosen from
a $C_6$-$C_{10}$ aryl group optionally substituted at from 1 to 3 substitutable positions with one or more group chosen from OH, halogen, $C_1$-$C_{12}$ alkyl, $C_1$-$C_{12}$ alkoxy, $C_{1-12}$ alkoxyester, $C_{2-12}$ alkanoyl, or phenyl, wherein the phenyl is optionally substituted at from 1 to 3 substitutable positions with one or more group chosen from: hydroxyl, halogen, $C_{1-12}$ alkyl, $C_{1-12}$ alkoxy, $C_{1-12}$ alkoxyester, or $C_{2-12}$ alkanoyl;
mono- or di-$C_1$-$C_{12}$ hydrocarbyl-substituted amino;
$C_2$-$C_{12}$ alkanoyl;
$C_1$-$C_{10}$ alkyl;
$C_1$-$C_{10}$ acyl; or
$C_1$-$C_{10}$ alkoxyl; and
$R_{36}$ is a substituent that is present at from 0 to 4 instances of the phenoxy portion of Formula (I) and in each instance is independently chosen from hydroxyl, halogen, $C_1$-$C_{10}$ alkyl, $C_1$-$C_{12}$ alkoxy, $C_1$-$C_{12}$ alkoxyester, $C_2$-$C_{12}$ alkanoyl; phenyl; or $C_1$-$C_{12}$ acyl.

8. A granular stabilizer composition according to claim 7, wherein the 2-(2'-hydroxyphenyl)-1,3,5-triazine compound is selected from the group consisting of
4,6-bis-(2,4-dimethylphenyl)-2-(2-hydroxy-4-octyloxyphenyl)-s-triazine;
2-(4,6-diphenyl-1,3,5-triazin-2-yl-)-5-((hexyl)oxyl-phenol;
4,6-bis-(2,4-dimethylphenyl)-2-(2,4-dihydroxyphenyl)-s-triazine;
2,4-bis(2,4-dihydroxyphenyl)-6-(4-chlorophenyl)-s-triazine;
2,4-bis[2-hydroxy-4-(2-hydroxy-ethoxy)phenyl]-6-(4-chlorophenyl)-s-triazine;
2,4-bis[2-hydroxy-4-(2-hydroxy-4-(2-hydroxy-ethoxy)phenyl]-6-(2,4-dimethylphenyl)-s-triazine;
2,4-bis[2-hydroxy-4-(2-hydroxyethoxy)phenyl]-6-(4-bromophenyl)-s-triazine;
2,4-bis[2-hydroxy-4-(2-acetoxyethoxy)phenyl]-6-(4-chlorophenyl)-s-triazine;
2,4-bis(2,4-dihydroxyphenyl)-6-(2,4-dimethylphenyl)-s-triazine;
2,4-bis(4-biphenylyl)-6-[2-hydroxy-4-[(octyloxycarbonyl)ethylideneoxy]phenyl]-s-triazine;
2,4-bis(4-biphenylyl)-6-[2-hydroxy-4-(2-ethylhexyloxy)phenyl]-s-triazine;
2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;
2,4-bis(2,4-dimethylphenyl)-6-[2-hydroxy-4(-3-benzyloxy-2-hydroxypropyloxy)phenyl]-s-triazine;
2,4-bis(2-hydroxy-4-n-butyloxyphenyl)-6-(2,4-di-n-butyloxyphenyl)-s-triazine;
2,4-bis(2,4-dimethylphenyl)-6-[2-hydroxy-4-(3-nonyloxy-2-hydroxypropyloxy)-5-α-cumylphenyl]-s-triazine;
methylenebis-{2,4-dimethylphenyl)-6-[2-hydroxy-4-(3-butyloxy-2-hydroxypropoxy)phenyl]-s-triazine};
methylene bridged dimer mixture bridged in the 3:5', 5:5' and 3:3' positions in a 5:4:1 ratio;
2,4,6-tris(2-hydroxy-4-isooctyloxycarbonyliso-propylideneoxy-phenyl)-s-triazine;
2,4,6,-tris(2-hydroxy-4-octyloxy-phenyl)-1,3,5-triazine;
2,4-bis(2,4-dimethylphenyl)-6-(2-hydroxy-4-hexyloxy-5-α-cumylphenyl)-s-triazine;
2-(2,4,6-trimethylphenyl)-4,6-bis[2-hydroxy-4-(3-butyloxy-2-hydroxypropyloxy)phenyl]-s-triazine;
2,4,6-tris[2-hydroxy-4-(3-sec-butyloxy-2-hydroxypropyloxy)-phenyl]-s-triazine;
mixture of 4,6-bi s-(2,4-dimethylphenyl)-2-(2-hydroxy-4-(3-dodecyloxy-2-hydroxypropoxy)phenyl)-s-triazine and 4,6-bi s-(2,4-dimethylphenyl)-2-(2-hydroxy-4-(3-tridecyloxy-2-hydroxypropoxy)phenyl)-s-triazine;
4,6-bis-(2,4-dimethylphenyl)-2-(2-hydroxy-4(3-(2-ethylhexyloxy)-2-hydroxypropoxy)-phenyl)-s-triazine;

4,6-diphenyl-2-(4-hexyloxy-2-hydroxyphenyl)-s-triazine; and mixtures thereof.

9. A granular stabilizer composition according to claim 6, wherein the orthohydroxybenzophenone compound is selected from the group consisting of 2-hydroxy-4-methoxybenzophenone; 2,2'-dihydroxy-4-methoxybenzophenone; 2-hydroxy-4-octyloxybenzophenone; 2,2'-dihydroxy-4,4'-di-methoxybenzophenone; 2,2'-dihydroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4,4'-dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxybenzophenone; 2-hydroxy-4,4',6'-tributoxybenzophenone; 2-hydroxy-4-butoxy-4',5'-dimethoxybenzophenone; 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone; 2-hydroxy-4-ethoxybenzophenone; 2-hydroxy-4-propoxybenzophenone; 2-hydroxy-4-butoxybenzophenone; 2-hydroxy-4-methoxy-4'-methylbenzophenone; 2-hydroxy-4-methoxy-4'-ethylbenzophenone; 2-hydroxy-4-methoxy-4'-propylbenzophenone; 2-hydroxy-4-methoxy-4'-butylbenzophenone; 2-hydroxy-4-methoxy-4'-tertiary butylbenzophenone; 2-hydroxy-4-methoxy-4'-chlorobenzophenone; 2-hydroxy-4-methoxy-2'-chlorobenzophenone; 2-hydroxy-4-methoxy-4'-bromobenzophenone; 2-hydroxy-4,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4,4',5'-trimethoxybenzophenone; 2-hydroxy-4-ethoxy-4'-methylbenzophenone; 2-hydroxy-4-ethoxy-4'-ethylbenzophenone; 2-hydroxy-4-ethoxy-4'-propylbenzophenone; 2-hydroxy-4-ethoxy-4'-butylbenzophenone; 2-hydroxy-4-ethoxy-4'-methoxybenzophenone; 2-hydroxy-4,4'-diethoxybenzophenone; 2-hydroxy-4-ethoxy-4'-propoxybenzophenone; 2-hydroxy-4-ethoxy-4'-butoxybenzophenone; 2-hydroxy-4-ethoxy-4'-chlorobenzophenone; 2-hydroxy-4-ethoxy-4'-bromobenzophenone; and mixtures thereof.

10. A granular stabilizer composition according to claim 6, wherein the orthohydroxyphenyl benzotriazole compound is selected from the group consisting of 2-(2'-hydroxy-5'-methylphenyl)-benzotriazole; 2-(2'-hydroxy-5'-tert-butylphenyl)benzotriazole; 2-(2'-hydroxy-3'-methyl-5'-tert-butylphenyl)-benzotriazole; 2-(2'-hydroxy-5'-cyclohexylphenyl)-benzotriazole; 2-(2'-hydroxy-3',5'-dimethylphenyl)-benzotriazole; 2-(2'-hydroxy-5'-tert-butylphenyl)-5-chloro-benzotriazole; 2-(2'-hydroxy-5-tert-octylphenyl)-2H-benzotriazole; 2-(2'-hydroxy-5-octylphenyl)-2H-benzotriazole; 2-(3',5'-di-tert-butyl-2'-hydroxyphenyl)-5-chlorobenzotriazole; 2-(3'-tert-butyl-5'-methyl-butyl-2'hydroxyphenyl)-5-chlorobenzotriazole; 2-(3',5'-di-tert-amyl-2'-hydroxyphenyl)benzotriazole; 2-(3',5'-bis(α,α-dimethylbenzyl)-2'-hydroxyphenyl)benzotriazole; 2-(3'-tert-butyl-2'-hydroxy-5'-(2-octyloxycarbonylethyl)phenyl)benzotriazole; 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol of 300 g/mol; 2-[2'-hydroxy-3'-(α,α-dimethylbenzyl)-5'-(1,1,3,3-tetramethyl-butyl)phenyl]benzotriazole; 5-trifluoromethyl-2-(2-hydroxy-3-α-cumyl-5-tert-octylphenyl)-2H-benzotriazole; 2-(2'-hydroxy-5'-(2-hydroxyethyl)phenyl)benzotriazole; 2-(2'-hydroxy-5'-(2-methacryloyloxyethyl)phenyl)benzotriazole; 2-(3'-tert-butyl-5'-methyl-2'-hydroxyphenyl)-5-chloro-benzotriazole; 2-(3'-sec-butyl-5'-tert.butyl-2'-hydroxyphenyl)-benzotriazole; 2-(3',5'-di-tert-butyl-2'-hydroxyphenyl)-benzotriazole; 2-(5'-tert-octyl-2'-hydroxyphenyl)-benzotriazole; 2-(3'-dodecyl-5'-methyl-2'-hydroxyphenyl)-benzotriazole; 2-(3'-tert-butyl-5'-(2-octyloxycarbonylethyl)-2'-hydroxyphenyl)-5-chlorobenzotriazole; 2-(5'-methyl-2'-hydroxyphenyl)-benzotriazole; 2-(5'-tert-butyl-2'-hydroxyphenyl)-benzotriazole; 2-(2'-hydroxy-3'-di-tert-butylphenyl)-benzotriazole; and mixtures thereof.

11. A granular stabilizer composition according to claim 6, wherein the benzoxazinone compound is selected from the group consisting of: 2-methyl-3,1-benzoxazin-4-one; 2-butyl-3,1-benzoxazin-4-one; 2-phenyl-3,1-benzoxazin-4-one; 2-(1- or 2-naphthyl)-3,1-benzoxazin-4-one; 2-(4-biphenyl)-3,1-benzoxazin-4-one; 2-p-nitrophenyl-3,1-benzoxazin-4-one; 2-m-nitrophenyl-3,1-benzoxazin-4-one; 2-p-benzoylphenyl-3,1-benzoxazin-4-one; 2-p-methoxyphenyl-3,1-benzoxazin-4-one; 2-O-methoxyphenyl-3,1-benzoxazin-4-one; 2-cyclohexyl-3,1-benzoxazin-4-one; 2-p-(or m-)phthalimidephenyl-3,1-benzoxazin-4-one; N-phenyl-4-(3,1-benzoxazin-4-one-2-yl)phthalimide; N-benzoyl-4-(3,1-benzoxazine-4-one-2-yl)aniline; N-benzoyl-N-methyl-4-(3,1-benzoxazin-4-one-2-yl)-aniline; 2-[p-(N-phenylcarbamonyl)phenyl]-3,1-benzoxazin-4-one; 2-[p-(N-phenyl N-methylcarbamoyl)phenyl]-3,1-benzoxazin-4-one; 2,2'-bis(3,1-benzoxazin-4-one); 2,2'-ethylenebis(3,1-benzoxazin-4-one); 2,2'-tetramethylenebis(3,1-benzoxazin-4-one); 2,2'-hexamethylenebis(3,1-benzoxazin-4-one); 2,2'-decamethylenebis(3,1-benzoxazin-4-one); 2,2'-p-phenylenebis(3,1-benzoxazin-4-one); 2,2'-m-phenylenebis(3,1-benzoxazin-4-one); 2,2'-(4,4'-diphenylene)bis(3,1-benzoxazin-4-one); 2,2'-(2,6- or 1,5-naphthalene)bis(3,1-benzoxazin-4-one); 2,2'-(2-methyl-p-phenylene)bis(3,1-benzoxazin-4-one); 2,2'-(2-nitro-p-phenylene)bis(3,1-benzoxazin-4-one); 2,2'-(2-chloro-p-phenylene)bis(3,1-benzoxazin-4-one); 2,2'-(1,4-cyclohexylene)bis(3,1-benzoxazin-4-one); N-p-(3,1-benzoxazin-4-on-2-yl)phenyl; 4-(3,1-benzoxazin-4-on-2-yl)phthalimide; N-p-(3,1-benzoxazin-4-on-2-yl)benzoyl; 4-(3,1-benzoxazin-4-on-2-yl)aniline; 1,3,5-tri(3,1-benzoxazin-4-on-2-yl)benzene; 1,3,5-tri(3,1-benzoxazin-4-on-2-yl)naphthalene; 2,4,6-tri(3,1-benzoxazin-4-on-2-yl)naphthalene; and mixtures thereof.

12. A granular stabilizer composition according to claim 1, wherein the hindered amine light stabilizer compound (HALS) comprises:

i) a functional group according to Formula (II):

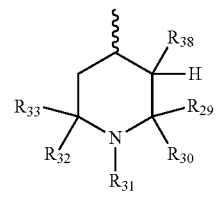

(II)

wherein
R$_{31}$ is chosen from: hydrogen; OH; C$_1$-C$_{20}$ hydrocarbyl; —CH$_2$CN; C$_1$-C$_{12}$ acyl; or C$_1$-C$_{18}$ alkoxy;
R$_{38}$ is chosen from: hydrogen; or C$_1$-C$_8$ hydrocarbyl; and
each of R$_{29}$, R$_{30}$, R$_{32}$, and R$_{33}$ is independently chosen from C$_1$-C$_{20}$ hydrocarbyl, or R$_{29}$ and R$_{30}$ and/or R$_{32}$ and R$_{33}$ taken together with the carbon to which they are attached form a C$_5$-C$_{10}$ cycloalkyl; or
ii) a functional group according to Formula (IIa):

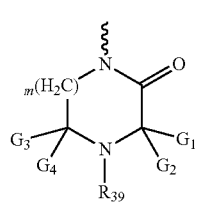

(IIa)

wherein
m is an integer from 1 to 2;
R$_{39}$ is chosen from: hydrogen; OH; C$_1$-C$_{20}$ hydrocarbyl; —CH$_2$CN; C$_1$-C$_{12}$ acyl; or C$_1$-C$_{18}$ alkoxy; and
each of G$_1$-G$_4$ is independently chosen from C$_1$-C$_{20}$ hydrocarbyl; or
iii) mixtures of functional groups according to Formula (II) and Formula (IIa).

13. A granular stabilizer composition according to claim 12, wherein the HALS compound is selected from the group consisting of: bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine; a condensate of N,N'-bis(2,2,6,6-tetramethylpiperidin-4-yl)hexamethylenediamine and 4-morpholino-2,6-dichloro-1,3,5-triazine, methylated; a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a mixture of 4-hexadecyloxy- and 4-stearyloxy-1,2,2,6,6-pentamethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis(2,2,6,6-tetramethyl-4-piperidyl) butane-1,2,3,4-tetracarboxylate; 1,2,3,4-butanetetracarboxylic acid, tetrakis(1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol, 1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl)carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperidinol with higher fatty acids; 3-dodecyl-1-(2,2,6,6-tetramethyl-4-piperidyl)pyrrolidine-2,5-dione; 1H-Pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"-[1,3,5-triazine-2,4,6-triyltris[(cyclohexylimino)-2,1-ethanediyl]]tris[3,3,5,5-tetramethyl-; piperazinone, 1,1',1"41,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl)

nitrilotriacetate; 1,5-dioxaspiro{5,5}undecane-3,3-dicarboxylic acid, bis(1,2,2,6,6-pentamethyl-4-piperidinyl): 1,5-dioxaspiro {5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',13'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',13'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl) pyrrolidine-2,5-di one; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4. 5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); $N^1$-(β-hydroxyethyl)3,3-pentamethylene-5,5-dimethylpiperazin-2-one; $N^1$-tert-octyl-3,3,5,5-tetramethyl-diazepin-2-one; $N^1$-tert-octyl-3,3-pentamethylene-5,5-hexamethylene-diazepin-2-one; $N^1$-tert-octyl-3,3-pentamethylene-5,5-dimethylpiperazin-2-one; trans-1,2-cyclohexane-bis-($N^1$-5,5-dimethyl-3,3-pentamethylene-2-piperazinone; trans-1,2-cyclohexane-bis-($N^1$-3,3,5,5-dispiropentamethylene-2-piperazinone); $N^1$-isopropyl-1,4-diazadispiro-(3,3,5,5)pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentamethylene-1,4-diazepin-2-one; $N^1$-octyl-1,4-diazadispiro-(3,3,5,5) pentamethylene-1,5-diazepin-2-one; 2N,4N'-dibutyl-2N-4N'-bis(1,2,2,6,6-pentamethyl-4-piperidinyl)-6-(1-pyrrolidinyl)-1,3,5-triazine-2,4-diamine; and mixtures thereof.

14. A granular stabilizer composition according to claim 1, wherein the hindered benzoate compound is according to Formula (VI):

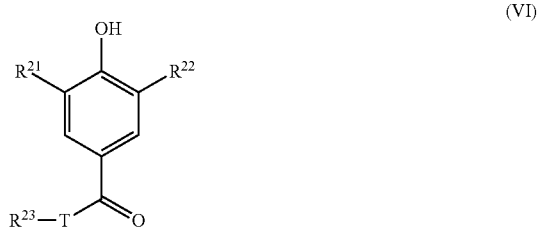

wherein each of $R^{21}$ and $R^{22}$ is independently chosen from a $C_1$-$C_{12}$ alkyl;

T is chosen from O or $NR^{24}$, where $R^{24}$ is H or a $C_1$-$C_{30}$ hydrocarbyl; and $R^{23}$ is H or a $C_1$-$C_{30}$ hydrocarbyl.

15. A granular stabilizer composition according to claim 14, wherein the hindered benzoate compound is selected from the group consisting of 2,4-di-tert-butylphenyl-3,5-di-tert-butyl-4-hydroxybenzoate; hexadecyl-3,5-di-tert-butyl-4-hydroxybenzoate; octadecyl-3,5-di-tert-butyl-4-hydroxybenzoate; octyl-3,5-di-tert-butyl-4-hydroxybenzoate; decyl-3,5-di-tert-butyl-4-hydroxybenzoate; dodecyl-3,5-di-tert-butyl-4-hydroxybenzoate; tetradecyl-3,5-di-tert-butyl-4-hydroxybenzoate; behenyl-3,5-di-tert-butyl-4-hydroxybenzoate; 2-methyl-4,6-di-tert-butylphenyl-3,5-di-tert-butyl-4-hydroxybenzoate; butyl-3-[3-t-butyl-4-(3,5-di-t-butyl-4-hydroxybenzoyloxy)phenyl]propionate; and mixtures thereof.

16. A granular stabilizer composition according to claim 1, wherein the hindered phenol compound comprises a molecular fragment according to one or more of Formula (IVa), (IVb), or (IVc):

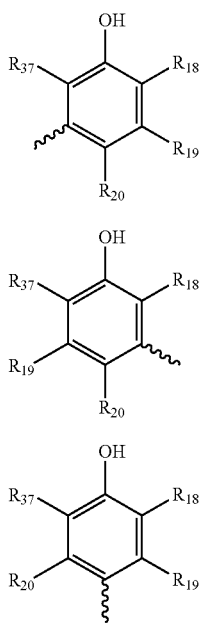

wherein
$R_{18}$ in each of Formula (IVa), (IVb), and (IVc) is chosen from hydrogen or a $C_{1-4}$ hydrocarbyl;
each of $R_{19}$ and $R_{20}$ in Formula (IVa), (IVb), and (IVc) is individually chosen from hydrogen or a $C_1$-$C_{20}$ hydrocarbyl; and
$R_{37}$ in each of Formula (IVa), (IVb), and (IVc) is chosen from $C_1$-$C_{12}$ hydrocarbyl.

17. A granular stabilizer composition according to claim 16, wherein $R_{18}$ and $R_{37}$ in each of Formula (IVa), (IVb), and (IVc) are independently chosen from methyl or t-butyl.

18. A granular stabilizer composition according to claim 16, wherein the at least one hindered phenol compound is selected from the group consisting of (1,3,5-tris(4-t-butyl-3-hydroxy-2,6-dimethylbenzyl)-1,3,5-triazine-2,4,6-(1H,3H,5H)-trione; 1,3,5-tris(3,5-di-tert-butyl-4-hydroxybenzyl)-1,3,5-triazine-2,4,6(1H,3H,5H)-trione; 1,1,3-tris(2'-methyl-4'-hydroxy-5'-t-butylphenyl)butane; triethylene glycol bis[3-(3-t-butyl-4-hydroxy-5-methylphenyl)propionate]; 4,4'-thiobis(2-t-butyl-5-methylphenol); 2,2'-thiodiethylene bis[3-(3-t-butyl-4-hydroxyl-5-methylphenyl)propionate]; octadecyl 3-(3'-t-butyl-4'-hydroxy-5'-methylphenyl) propionate; tetrakismethylene(3-t-butyl-4-hydroxy-5-methylhydrocinnamate)methane; N,N'-hexamethylene bis[3-(3-t-butyl-4-hydroxy-5-methylphenyl)propionamide]; di(4-tertiarybutyl-3-hydroxy-2,6-dimethyl benzyl) thiodipropionate; and octadecyl 3,5-di-(tert)-butyl-4-hydroxyhydrocinnamate.

19. A granular stabilizer composition according to claim 1, wherein the phosphite or phosphonite is selected from the group consisting of
i) a compound according to Formulas 1-7:

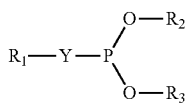 (1)

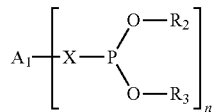 (2)

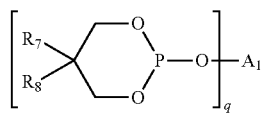 (3)

 (4)

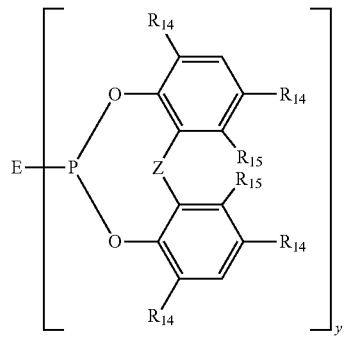 (5)

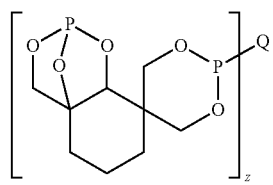 (6)

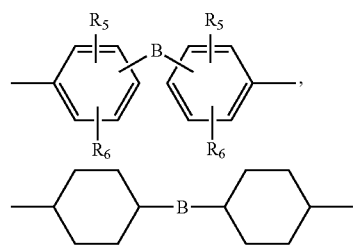 (7)

in which the indices are integral and
n is 2, 3 or 4; p is 1 or 2; q is 2 or 3; y is 1, 2 or 3; and z is 1 to 6;

$A_1$, if n or q is 2, is $C_2$-$C_{18}$ alkylene; $C_2$-$C_{12}$ alkylene interrupted by oxygen, sulfur or —$NR_4$—; a radical of the formula or phenylene;
$A_1$, if n or q is 3, is a radical of the formula —$C_rH_{2r-1}$—, wherein r is 4 to 12;

$A_1$, if n is 4, is $$-CH_2-\underset{\underset{CH_2-}{|}}{\overset{\overset{CH_2-}{|}}{C}}-CH_2-;$$

B is a direct bond, —$CH_2$—, —$CHR_4$—, —$CR_1R_4$—, sulfur, $C_5$-$C_7$ cycloalkylidene, or cyclohexylidene which is substituted by from 1 to 4 $C_1$-$C_4$ alkyl radicals in position 3, 4 and/or 5;
$D_1$, if p is 1, is $C_1$-$C_4$ alkyl and, if p is 2, is —$CH_2OCH_2$—;
$D_2$ is $C_1$-$C_4$ alkyl;
E, if y is 1, is $C_1$-$C_{18}$ alkyl, —$OR_1$ or halogen;
E, if y is 2, is —O-$A_2$-O—, wherein $A_2$ is as defined for $A_1$ when n is 2;
E, if y is 3, is a radical of the formula $R_4C(CH_2O-)_3$ or $N(CH_2CH_2O-)_3$;
Q is the radical of an at least z-valent mono or poly alcohol or phenol, this radical being attached via the oxygen atom of the OH group of the mono or poly alcohol or phenol to the phosphorus atom;
$R_1$, $R_2$ and $R_3$ independently of one another are $C_1$-$C_{18}$ alkyl which is unsubstituted or substituted by halogen, —$COOR_4$, —CN or —$CONR_4R_4$; $C_2$-$C_{18}$ alkyl interrupted by oxygen, sulfur or —$NR_4$—; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$-$C_9$ phenylalkyl; or a radical of the formula

[structure: —$(CH_2)_m$—phenyl with $R_5$, $R_6$ substituents and —OH]

in which m is an integer from the range 3 to 6;
$R_4$ is hydrogen, $C_1$-$C_8$ alkyl, $C_5$-$C_{12}$ cycloalkyl or $C_7$-$C_9$ phenylalkyl,
$R_5$ and $R_6$ independently of one another are hydrogen, $C_1$-$C_8$ alkyl or $C_5$-$C_6$ cycloalkyl,
$R_7$ and $R_8$, if q is 2, independently of one another are $C_1$-$C_4$ alkyl or together are a 2,3-dehydropentamethylene radical; and
$R_7$ and $R_8$, if q is 3, are methyl;
each instance of $R_{14}$ is independently chosen from hydrogen, $C_1$-$C_9$ alkyl or cyclohexyl,
each instance of $R_{15}$ is independently chosen from hydrogen or methyl,
X and Y are each a direct bond or oxygen,
Z is a direct bond, methylene, —$C(R_{16})_2$— or sulfur, and
$R_{16}$ is $C_1$-$C_8$ alkyl;
  ii) a trisarylphosphite according to Formula 8:

[structure (8): tris(aryl) phosphite with $R_{17}$ substituents at 0-5 positions]

wherein
$R_{17}$ is present at from 0 to 5 positions of the aromatic portion of Formula 8 and in each instance is independently chosen from $C_1$-$C_{20}$ alkyl, $C_3$-$C_{20}$ cycloalkyl, $C_4$-$C_{20}$ alkyl cycloalkyl, $C_6$-$C_{10}$ aryl, or $C_7$-$C_{20}$ alkylaryl; and
  iii) combinations of (i) and (ii).
20. A granular stabilizer composition according to claim 19, wherein the organic phosphite or phosphonite is selected from the group consisting of triphenyl phosphite; diphenyl alkyl phosphites; phenyl dialkyl phosphites; trilauryl phosphite; trioctadecyl phosphite; distearyl pentaerythritol phosphite; tris(2,4-di-tert-butylphenyl) phosphite; tris(nonylphenyl) phosphite; a compound of formulae (A), (B), (C), (D), (E), (F), (G), (H), (J), (K) and (L):

(A) [structure: cyclic phosphite with four C(CH$_3$)$_3$ groups, H$_3$C—CH, and P—F]

(B) [structure: bis-aryl phosphite with C(CH$_3$)$_3$ groups, P—O—CH$_2$CH$_2$—N, triply repeated]

(C) [structure: cyclic phosphite with four C(CH$_3$)$_3$ groups and P—O—CH$_2$CH(C$_4$H$_9$)CH$_2$CH$_3$]

(D) [structure: pentaerythritol diphosphite with two (CH$_3$)$_3$C-phenyl-C(CH$_3$)$_3$ groups, —O—P—O—CH$_2$ ... CH$_2$—O—P—O—]

-continued

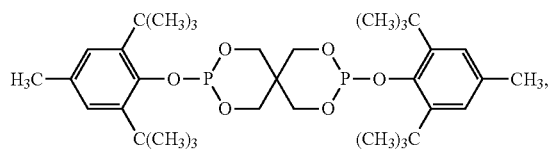 (E)

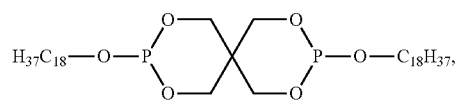 (F)

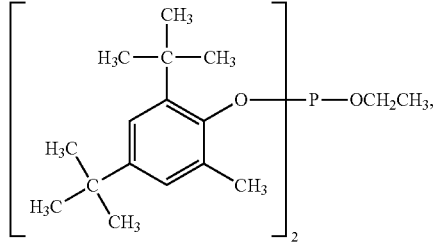 (G)

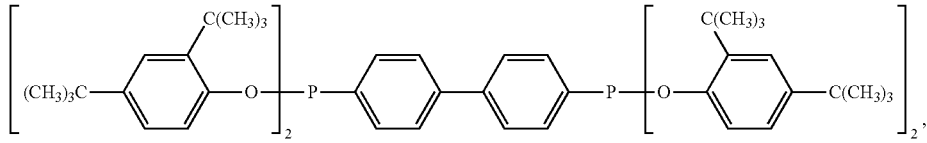 (H)

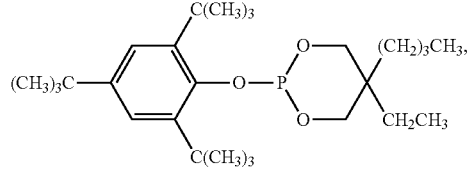 (J)

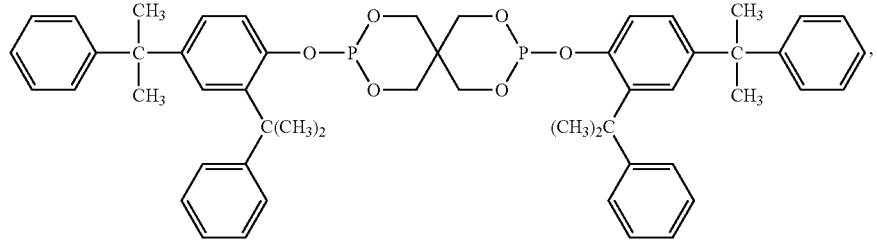 (K)

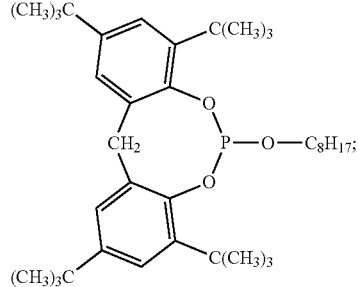 (L)

2-butyl-2-ethyl-1,3-propanediol 2,4,6-tri-t-butylphenol phosphite; bis-(2,6-di-t-butyl-4-methlphenyl) pentaerythritol diphosphite; 2-butyl-2-ethyl-1,3-propanediol 2,4-di-cumylphenol phosphite; 2-butyl-2-ethyl-1, 3-propanediol 4-methyl-2,6-di-t-butylphenol phosphite; bis-(2,4,6-tri-t-butyl-phenyl) pentaerythritol diphosphite; and combinations thereof.

21. A granular stabilizer composition according to claim 19, wherein the phosphite is selected from the group consisting of:

bis-(2,6-di-t-butyl-4-methlphenyl)pentaerythritol diphosphite;
(bis-(2,4-dicumylphenyl)pentaerythritol diphosphite;
bis-(2,4-di-t-butyl-phenyl)pentaerythritol diphosphite; and
bis-(2,4,6-tri-t-butyl-phenyl)pentaerythritol diphosphite.

22. A granular stabilizer composition according to claim 19, wherein the trisarylphosphite is selected from the group consisting of:
tris-(2,4-di-t-butylphenyl)phosphite;
tris(4-nonylphenyl) phosphite; and
triphenyl phosphite.

23. A granular stabilizer composition according to claim 1, wherein the thioester compound is selected from the group consisting of: dilauryl thiodipropionate; distearyl thiodipropionate; pentaerythrithol tetrakis-(3-dodecylthipropionate); tetra-alkyl thioethyl thiodisuccinate; 2,12-dihydroxy-4,10-dithia-7-oxatridecamethylene bis[3-(dodecylthio)propionate]; polyalkanol esters of alkylthio-alkanoic acids; dialkyl 3,3'-thiodipropionates; and mixtures thereof.

24. A granular stabilizer composition according to claim 1, wherein the co-active agent comprises an alkoxylated alcohol according to Formula (III):

R—(OCHR'CH$_2$)$_y$—OH　(III)

wherein
R of Formula (III) is a hydrocarbyl group having from 12 to 60 carbon atoms;
R' of Formula (III) is chosen from H or $C_1$-$C_4$ alkyl; and
y is an integer from 1 to 100.

25. A granular stabilizer composition according to claim 1, wherein the co-active agent comprises an alkoxylated ester of fatty acid according to Formula (IIIa):

RCO—(OCHR'CH$_2$)$_y$—OH　(IIIa)

wherein
R of Formula (IIIa) is a hydrocarbyl group having from 12 to 60 carbon atoms;
R' of Formula (IIIa) is chosen from H or $C_1$-$C_4$ alkyl; and
y is an integer from 1 to 100.

26. A granular stabilizer composition according to claim 24 or claim 25, wherein R of Formula (III) or (IIIa) has from 12 to 30 carbon atoms and y of Formula (III) or (IIIa) is an integer from 2 to 60.

27. A granular stabilizer composition according to any one of claim 24 to claim 26, wherein the compound according to Formula (III) or (IIIa) is ethoxylated alcohol or ethoxylated ester of a fatty acid.

28. A granular stabilizer composition according to claim 1, wherein the co-active agent comprises
   i) an alkoxylated fatty amine compound according to Formula (V)

$R^4$—$NR^2R^3$　(V), or salt thereof,
   or
   ii) an alkoxylated fatty amide compound according to Formula (Va):

$$R^4C(=O)—NR^2R^3,$$ (Va)

wherein
$R^4$ of Formula (V) and Formula (Va) is chosen from a $C_8$-$C_{60}$ hydrocarbyl group, optionally interrupted with one or more hetero atoms; and
each of $R^2$ and $R^3$ of Formula (V) and Formula (Va) is independently chosen from
H, a $C_1$-$C_{30}$ alkyl, or (—CH$_2$CHR$^5$O-)n-H, wherein $R^5$ is chosen from H or methyl, and n is an integer from 1 to 100; and
wherein at least one of $R^2$ or $R^3$ of Formula (V) and Formula (Va) is chosen from
(—CH$_2$CHR$^5$O-)n-H.

29. A granular stabilizer composition according to claim 28, wherein $R^4$ of Formula (V) and Formula (Va) is a $C_8$-$C_{36}$ alkyl group, optionally interrupted by one or more hetero atom.

30. A granular stabilizer composition according to claim 29, wherein $R^4$ of Formula (V) and Formula (Va) is a $C_{12}$-$C_{30}$ alkyl group, optionally interrupted with one or more hetero atom.

31. A granular stabilizer composition according to any one of claims 28 to 30, wherein the total value of n is an integer from 1 to 10.

32. A granular stabilizer composition according to claim 28, wherein the co-active agent is an alkoxylated fatty amine compound according to Formula (V) selected from the group consisting of: ethoxylated and/or propoxylated stearyl amines; oleyl amines; tallow amines; cetyl amines; capryl amines; hydrogenated tallow amines; cocoamines; salts thereof; and mixtures thereof.

33. A granular stabilizer composition according to claim 28, wherein the co-active agent is a carboxylic acid salt of the alkoxylated fatty amine compound according to Formula (V).

34. A granular stabilizer composition according to claim 33, wherein the carboxylic acid salt is derived from a $C_2$-$C_{30}$ carboxylic acid.

35. A granular stabilizer composition according to claim 34, wherein the carboxylic acid salt is derived from a $C_{12}$-$C_{24}$ carboxylic acid.

36. A granular stabilizer composition according to claim 28, wherein the co-active agent is an alkoxylated fatty amide compound according to Formula (Va) selected from the group consisting of cocoamide monoethanol amine; cocoamide diethanol amine; cocoamide ethoxylates; lauramide diethanol amine; oleamide diethanol amine; oleic acid monoethanol amide; and mixtures thereof.

37. A granular stabilizer composition according to claim 1, wherein the stabilizer composition contains less than 0.5 wt. % of carrier polymer resin.

* * * * *